United States Patent
Kumar

(10) Patent No.: US 9,466,045 B1
(45) Date of Patent: Oct. 11, 2016

(54) SHIPMENT OPTIMIZATION

(71) Applicant: Amazon Technologies, Inc., Reno, NV (US)

(72) Inventor: Nirvay Kumar, Jharkhand (IN)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/102,884

(22) Filed: Dec. 11, 2013

(51) Int. Cl.
*G06Q 10/08* (2012.01)
*G01C 21/34* (2006.01)

(52) U.S. Cl.
CPC .................................. *G06Q 10/087* (2013.01)

(58) Field of Classification Search
None
See application file for complete search history.

(56) References Cited

U.S. PATENT DOCUMENTS

| | | | |
|---|---|---|---|
| 8,705,893 B1* | 4/2014 | Zhang et al. | 382/285 |
| 2002/0174021 A1* | 11/2002 | Chu et al. | 705/26 |
| 2004/0088187 A1* | 5/2004 | Chudy et al. | 705/2 |
| 2004/0093274 A1* | 5/2004 | Vanska et al. | 705/26 |
| 2009/0063307 A1* | 3/2009 | Groenovelt | G06Q 10/087 705/28 |
| 2010/0150458 A1* | 6/2010 | Angell | G06F 17/30781 382/224 |
| 2013/0035857 A1* | 2/2013 | Lee et al. | 701/533 |
| 2013/0173435 A1* | 7/2013 | Cozad, Jr. | 705/28 |
| 2014/0089032 A1* | 3/2014 | Bell | 705/7.24 |
| 2014/0156553 A1* | 6/2014 | Leach et al. | 705/338 |
| 2015/0032252 A1* | 1/2015 | Galluzzo et al. | 700/218 |

* cited by examiner

*Primary Examiner* — Yonel Beaulieu
*Assistant Examiner* — Krishnan Ramesh
(74) *Attorney, Agent, or Firm* — Athorus, PLLC

(57) ABSTRACT

Shipments of ordered items may be optimized by minimizing geographic and time constraints, thereby improving efficiencies and reducing costs. Geographic locations of items included in an order may be considered when generating an optimal path for retrieving such items and for processing the order. Upon identifying the items included in an order, locations of an origin, a destination and each of the items may be determined by any means, such as through a photogrammetric analysis of one or more images, and an optimal path for picking each of the items may be determined based on the respective locations of each of the items. Additionally, orders for items for delivery to a common destination may be combined into a single shipment if the orders are received within a window of time, and if the items are sufficiently compatible with one another.

28 Claims, 13 Drawing Sheets

SHIPMENT OPTIMIZATION

BACKGROUND

A fulfillment center is a facility, warehouse or other like structure that is adapted to receive items from vendors or other fulfillment centers, and to store such items in one or more designated spaces or areas therein. Such fulfillment centers may include stations for receiving shipments of items, for storing such items, and/or for preparing such items for delivery to customers. When an order for the purchase of one or more of the items stored in a fulfillment center is received from a customer, the ordered items may be retrieved from the spaces or areas in which the ordered items are stored, and prepared for delivery to the customer, e.g., by packing the ordered items into one or more appropriate containers with a sufficient type and amount of dunnage, and delivering the containers to an address designated by the customer.

Online marketplaces are increasingly popular electronic forums through which customers may place orders for one or more items over the Internet. The growth of online marketplaces, and the rapid expansion in the scope and breadth of their available offerings, has led to a concomitant proliferation of fulfillment centers. Online marketplaces usually use fulfillment centers to allow vendors to maintain inventories of items that are available for sale at the online marketplaces in a centralized location. Upon the receipt of an order for one or more items from a customer, an online marketplace may electronically assign the order to the fulfillment center, and a list of the items included in the order may be provided to a staff member at the fulfillment center. The staff member must physically retrieve the items from the locations in which they are stored, and transport the items to a distribution station in preparation for delivery to the customer. The list of items may be provided to the staff member on paper, electronically (e.g., to a handheld computer maintained by the staff member), or in any other format.

Today's online marketplaces offer a wider variety of items to customers, including but not limited to goods, services, products, media or information. Accordingly, fulfillment centers that are associated with such marketplaces include increasingly large and complex facilities having expansive capabilities and high-technology accommodations for items, such as temperature-controlled spaces for items that must be maintained at or near certain temperatures (e.g., produce), or light-restricted spaces for photodegradable items (e.g., camera film or various ales or stouts). Moreover, in order to accommodate vast numbers and types of items of various sizes, some fulfillment centers featuring storage areas as large as one million square feet or more. Therefore, in order to prepare and ship an order that includes a large number or numerous types of items to a customer, a staff member may be required to walk several thousand feet, or even miles, within a fulfillment center in order to retrieve the items in fulfillment of the order. Where a customer submits multiple orders for items, the arduous task of picking, packaging and shipping ordered items must often be repeated for each and every order.

DETAILED DESCRIPTION

Figure 1:
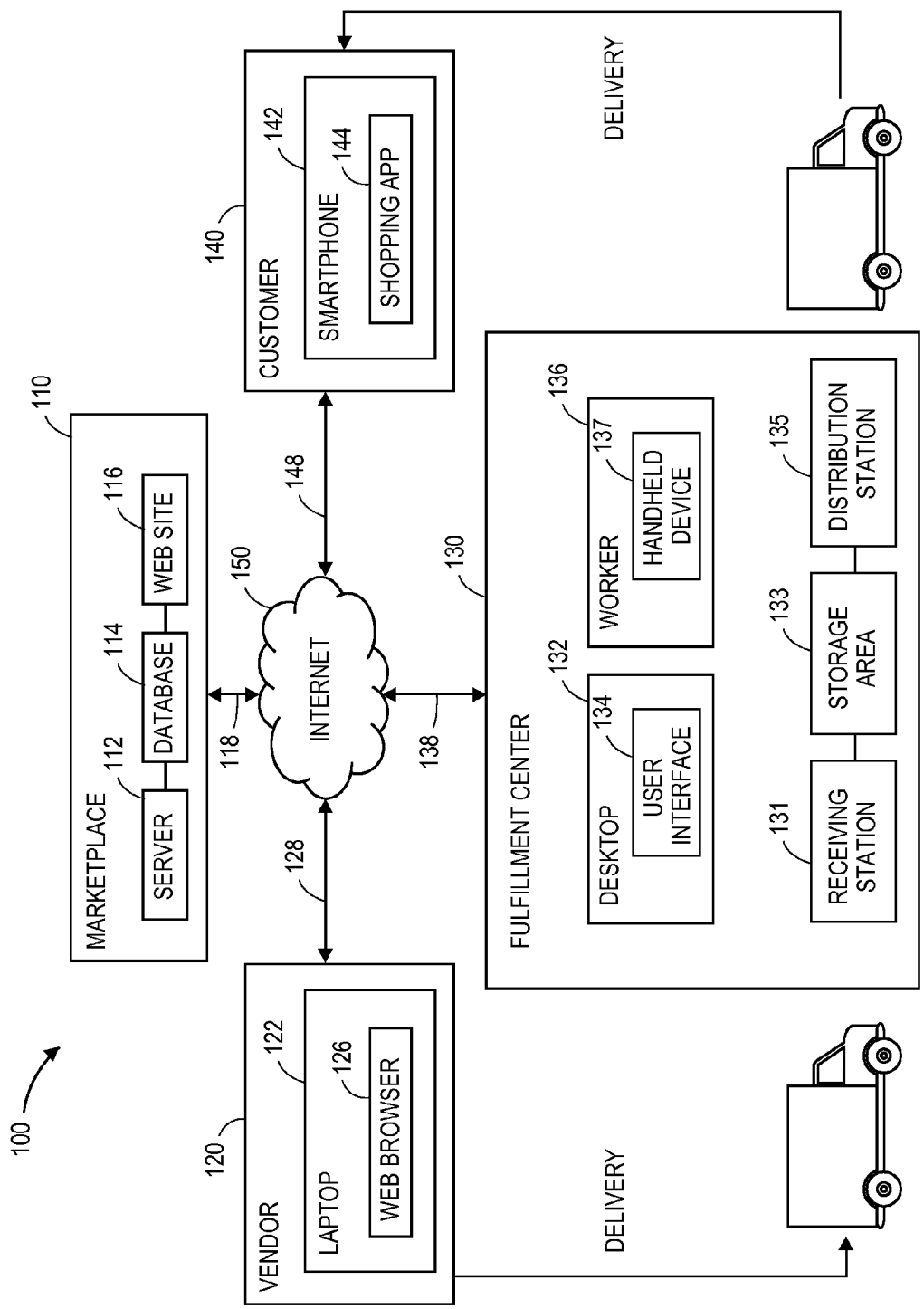
FIG. 1 is a block diagram of one system for shipment optimization, in accordance with embodiments of the present disclosure.

As is set forth in greater detail below, the present disclosure is directed to optimizing the identification, retrieval, preparation and delivery of items identified in an order received from a customer. Specifically, the systems and methods disclosed herein are directed to optimizing shipments of ordered items based on the respective locations of the ordered items within a fulfillment center or like facility, or based on the times at which such orders are received. In defining a plan for retrieving items that are to be included in a shipment, the locations of the items within a fulfillment center may be determined by any means or method, including a manual determination (e.g., by conducting an inventory in which the locations of such items are determined), an automatic determination (e.g., by loading or uploading one or more records identifying the locations of such items), or by an analysis of one or more images (e.g., photographs) of elements or architectural features of the fulfillment center (e.g., by capturing such images and evaluating the contents thereof to identify facilities or structures housing such items, or the items themselves), such as by any known feature detection, object recognition or photogrammetric means or methods.

Once the locations of the items to be included in the shipment have been determined, the plan for retrieving the items may be defined based on the respective locations of such items, in a manner that minimizes the time expended and the distance traveled by one or more staff members to retrieve such items. Furthermore, where multiple orders of items for delivery to a common location are received within a predefined window of time, such orders may be considered together when preparing one or more shipments of the items for delivery to the customer. The systems and methods of the present disclosure thus enable the shipments of ordered items to be delivered more efficiently and effectively than according to systems and methods of the prior art, i.e., when selecting the most appropriate containers, dunnage and modes of transit for the delivery of the shipments.

Online marketplaces feature electronic catalogs that enable customers (or users, buyers or purchasers) to choose from wide varieties of items (or goods, services, products, media or information) that may be provided by various vendors (or retailers, merchants, sellers, manufacturers or other distributors) and offered for sale over a network, such as the Internet. Items may be offered for sale by an online marketplace through one or more searchable or indexable item detail pages (or product detail pages) containing some or all available information regarding the items, as well as elements or features (e.g., links or buttons) which permit customers to add such items to a virtual "shopping cart" or "wish list," to purchase such items, or to recommend such items to one or more friends, associates or colleagues.

In order to facilitate the processing of orders for items and the delivery of shipments of ordered items to customers, online marketplaces frequently utilize one or more fulfillment centers (which may also be called fulfillment and distribution centers, distribution centers, warehouses, shipment preparation facilities, processing facilities, or other like terms) for receiving, storing and distributing items that have been received from vendors. Such fulfillment centers may include receiving stations or docks at which shipments of items may be received by any delivery means, as well as one or more versatile storage areas or regions having aisles, rows, bays, shelves, slots, bins, racks, tiers, bars, hooks, cubbies or other like storage means arranged in a fixed or flexible two-dimensional or three-dimensional architecture or layout. The various areas or regions of a fulfillment center may be accessed by human operators or machines, which may place items within such areas or regions upon their arrival.

Presently, when an online marketplace receives an order from a customer that includes a group of items, the order may be assigned to a fulfillment center, where a list of such items may be prepared and provided to a staff member, worker or operator, who is sometimes called a "picker." Following the ranking of the items in the list, the staff member then sets out to retrieve the items, and to transport the retrieved items to a distribution station or other aspect of the fulfillment center in preparation for delivery to an address or location specified by the customer. The list may include an identification number for each of the items, as well as identifiers of the locations (e.g., letters or numbers signifying aisles, rows, bays, shelves, slots, bins, racks, tiers, bars, hooks or cubbies) where the items may be found within the storage area. Because customers generally prefer to receive their ordered items in complete shipments, rather than in segmented or incomplete shipments, the staff member usually must retrieve each of the items shown in the list and in accordance with the ranking shown therein, regardless of locations of the respective items within the fulfillment center, before the shipments may be delivered to a customer.

Thus, when retrieving items in fulfillment of an order that includes a variety of items of different types, a picker may ultimately be forced to travel thousands of feet between and among aisles, rows or shelves of a fulfillment center, in a random or undefined manner, guided solely by an arbitrary ranking of the items in a list. For example, where a customer who is interested in riding bicycles places an order for a bicycle tire pump, a media player, a pair of sunglasses and athletics socks for use while riding a bicycle, a picker may be required to retrieve the bicycle tire pump from a first region of a fulfillment center that includes bicycle-specific items or sporting goods, and to retrieve the media player from a second region of the fulfillment center that includes electronics or computers and to retrieve the pair of sunglasses from a third region of the fulfillment center that includes accessories before retrieving the athletic socks from a fourth region of the fulfillment center that includes apparel. Because some of the relevant regions may be located within a close proximity of others, while others may be found in disparate locations, the picker may ultimately travel an unnecessarily long distance in retrieving the items. The picker's lengthy travels invariably translate to further inefficiencies, delays and expenses in processing the order.

Similarly, where a single customer places multiple orders for items for delivery to a common location, a picker may receive a list of items identified in each and every order, and be required to traverse through the fulfillment center on multiple occasions to obtain the items that are shown in the list as corresponding to each of the respective orders. Where a customer orders items on a regular basis or with great frequency, a picker may therefore travel the same path several times when retrieving separate items to be included in multiple orders. In fulfilling such orders, the items must be separately packed within discrete containers, along with a sufficient type or amount of dunnage that would fill the containers and protect the items packed therein, and placed in transit. Thus, a customer who frequently places orders for items may receive containers in various numbers and sizes which are determined based on the specific requirements of each individual order, which may not necessarily be the most efficient or cost-effective manner for delivering all of the ordered items to the customer.

Various measures that are intended to remedy some of the inefficiencies of the retrieval, preparation and delivery aspects of ordering items from an online marketplace described above have been implemented. One such measure is batch processing, in which a picker will be provided with a list of items corresponding to multiple shipments at once, along with instructions to retrieve all of the items in a single pass through the online marketplace. However, if the items shown in the list are not segregated based on the respective shipments in which they are to be included, such items must be separated and sorted at a distribution station or facility prior to preparing the items for delivery to addresses, locations or destinations identified by the customers who placed the respective orders. Even if the items shown in the list are segregated by shipment, retrieving the items according to a list may only compound such inefficiencies, in that a picker must pick each of the items that are to be included in a first shipment, in series, before picking each of the items that are to be included in a second shipment. Further, the use of batch processing is limited to the receipt of a number of orders within a finite period of time, and cannot address a scenario in which a customer places a first order for one or more items, followed by a second order for other items, if the first order has already been included in a batch and assigned to a picker at a time when the second order is placed.

The systems and methods of the present disclosure are directed toward considering geographic locations of the items included in an order when generating a path for retrieving such items and for processing the order for delivery to customers. Specifically, according to the systems and methods disclosed herein, an online marketplace may, upon identifying an order for multiple items, determine an origin of a picker, and a location of each of the items included in the order, as well as a destination to which the items should be delivered by the picker. Once a path that begins at the origin of the picker and extends to the locations of each of the items included in an order before concluding at the destination has been generated, an association between the path and the order may be stored in at least one data store, and the path may be provided to one or more pickers, along with instructions to retrieve the items of the order.

The locations of items within a fulfillment center may be determined by any manual or automatic means. According to one embodiment, locations of items may be identified through analyses of one or more images (including, but not limited to, photographic images) captured of one or more aspects within the fulfillment center, which may feature cameras or other imaging devices that are mounted, installed or otherwise positioned at strategic locations therein. Such cameras or other imaging devices may capture or otherwise record images of the structures, facilities or other elements for storing items inside the fulfillment center (e.g., aisles, rows, bays, shelves, slots, bins, racks, tiers, bars, hooks or cubbies, as well as walls, floors, ceilings or other structural features within the fulfillment center), and the contents and the locations of such structures, facilities or elements may be extrapolated from the images by one or more known analytical means (e.g., through the use of one or more feature detection or object recognition algorithms). A bin or other container may be identified by optically recognizing text, numbers or other identifiers (e.g., a one-dimensional bar code or a two-dimensional quick response bar code, or "QR" bar code), and the items that are stored or otherwise contained within the bin or container may be determined by resort to a look-up table or other data record. In parallel, or separately, a location of the bin or other container may be determined based on the known locations of other structures, facilities or elements within such images, based on the location of the bin or other container may be extrapolated. A location of an item may thus be determined by association, i.e., by determining the location of a bin or container in which the item is contained, and associating the location of the bin or container with the item.

For example, locations and distances of objects or features that are expressed within a image may be determined by one or more photogrammetric means. Photogrammetry is generally understood to refer to the science of obtaining geographic and dimensional information or data regarding physical objects and their environments through the capturing, measuring, and interpretation of one or more images. Photogrammetry is, therefore, an inverse of photography, in that photography captures three-dimensional objects, features and environments in a two-dimensional form, while photogrammetry extracts or extrapolates three-dimensional locations, distances or other metrics from one or more two-dimensional images of such objects, features or environments. Furthermore, photogrammetric analyses involving two or more images taken from multiple perspectives, e.g., stereophotogrammetry, may be particularly effective in determining such locations, distances or other metrics from such images.

Such extractions or extrapolations may be aided by the use of one or more marked identifiers that may be applied to structures, facilities or other elements of a fulfillment center, and may also be captured within one or more images. For example, where at least one face of a bin, a bay or a shelf includes markings denoting known nominal lengths (e.g., six inches, one foot, one yard), positions of points, or distances between points, within an image of the bin, the bay or the shelf may be estimated by comparing the positions or distances to such markings Additionally, any other means for determining a location of an item within a fulfillment center may be utilized in accordance with the systems and methods of the present disclosure, including one or more feature detection or extraction algorithms or object recognition techniques.

The online marketplace may further calculate a path that would permit a picker to travel an optimal path based on a shortest or minimum practicable distance from an origin to a destination when retrieving items that are to be included in a shipment according to one or more algorithms, formulas or means, and provide the path to the picker. The optimal path may take into account the specific two-dimensional or three-dimensional locations of items within a facility, as well as the architecture or configuration of the components or elements of the facility (e.g., the aisles, rows or shelves of a fulfillment center). Information regarding the optimal path, i.e., an association between an optimal path and the order, or between the optimal path and at least one of the items included in the order, may then be recorded and stored in at least one data store.

An optimal path, e.g., a "shortest path," for picking items may be calculated by one or more known algorithms, formulas or means, including those previously associated with transportation between points, vertices or nodes. For example, the systems and methods of the present disclosure may define such optimal paths using one or more iterations of common mathematical principles for solving shortest path problems, including but not limited to Dijkstra's Algorithm, Bellman-Ford Algorithm, Floyd-Warshall Algorithm, Johnson's Algorithm or hub labeling. Additionally, such algorithms, formulas or means may also use any amount of geospatial location information regarding a picker and/or items, such as identifications of the locations of each of the items included in an order, which may expressed in a two-dimensional Cartesian format, or $(x_i, y_i)$ for each item i, within a length $x_i$ and width $y_i$ of a fulfillment center, or in a three-dimensional format, or $(x_i, y_i, z_i)$ for each item i, referencing not only the length $x_i$ and the width $y_i$ of the fulfillment center, but also a height $z_i$ (e.g., on a shelf) within the fulfillment center. Such coordinates may be maintained or stored in one or more computer systems upon a placement of the items within a fulfillment center, following an inventory of the items stored in the fulfillment center, or at any other time. Likewise, a location of a picker and/or a designated portion of a fulfillment center may also be determined at a time of the order by any means, such as by determining a location of a handheld computer used by the picker and associating the location with the picker, by assigning the processing of the order to a particular aspect or component of a destination station having a known location, or by any other means.

Moreover, the systems and methods of the present disclosure are also directed toward combining various orders of items that are to be delivered to a common destination into one or more common shipments. For example, when an order is placed for an item, and an estimated delivery date for the item is established, a lead-time required to properly process the order and place the item in transit (e.g., to retrieve the item, pack the item and place the item in transit through a common carrier) may be determined. If another order is placed by the customer within a particular window of time, the systems and methods of the present disclosure may determine whether the attributes or characteristics of the items in each of the orders would permit such items to be consolidated, i.e., delivered together, and consider the multiple orders as a single order for the purpose of shipping the items included therein to the customer. For example, the common characteristics of some items would naturally permit orders for such items to be consolidated into a single shipment, such as an order for window treatments (e.g., shades or curtains) followed by an order for bedding (e.g., quilts, sheets or pillows), while the characteristics of some other items may not permit such a consolidation (e.g., orders for items containing hazardous materials and orders for meats, cheeses or other food products).

A window of time, i.e., a delay window, or a consolidation window, in which a subsequent order must be placed in order to qualify for consolidation with an earlier order may be defined by the time at which the earlier order was placed and the lead-time required to properly process the earlier order. For example, where a customer places an original order with an anticipated delivery in three days, and the original order would require a one-day lead-time for processing, any order received in the first two days following the original order may be considered for consolidation. Alternatively, the consolidation window may be defined based at least in part on (i.e., up to and including) a time of delivery of the original order. Moreover, consolidating a delivery of orders for items to a common destination may result in substantial cost savings, in that potentially fewer or smaller containers may accommodate the delivery of the ordered items, thereby reducing the costs of delivering the items (e.g., postage, shipping or handling costs) to the customer. Therefore, where two or more orders are identified as available for consolidation with one another, a customer may be offered a refund for shipping costs if the delivery of items listed in a first order are to be delayed in order to permit their consolidation with a second order, a discount on premium shipping of the items of the second order if such items may be appropriately combined with items of the first order, or any other consideration.

Notably, the systems and methods of the present disclosure are not limited to the generation of optimal paths for retrieving items from storage based on their respective locations of such items within a fulfillment center. Rather, the systems and methods disclosed herein may be utilized to generate any type of optimal path for performing any function or fulfilling any task, based on the respective locations of elements required for the performance of the function or the fulfillment of the task. For example, the systems and methods disclosed herein may be utilized to generate an optimal path for returning items in a canceled order to their respective locations within a fulfillment center. In this regard, the locations of the bins into which the items should be placed may be identified by any means (e.g., through the photogrammetric analysis of one or more images), the distances between the locations may be calculated, and an optimal path for returning the items to their locations may be determined based on the distances between the locations. Additionally, when conducting an inventory control analysis or quality assurance review, the locations of various items or containers to be evaluated may be determined, the distances between the locations may be calculated, and an optimal path for conducting the analysis or review may be determined based on the distances between the locations. Those of ordinary skill in the pertinent arts would recognize that the systems and methods disclosed herein are not limited to the fulfillment of orders in general, or to fulfillment center operations in particular.

Referring to FIG. 1, a block diagram of one system 100 for shipment optimization in accordance with the present disclosure is shown. As is shown in FIG. 1, the system 100 includes a marketplace 110, a vendor 120, a fulfillment center 130 and a customer 140 that are connected to one another across a network 150, such as the Internet. The marketplace 110 may be any entity or individual that wishes to make items from a variety of sources available for download, purchase, rent, lease or borrowing by customers using a networked computer infrastructure, including one or more physical computer servers 112 and databases 114 for hosting a web site 116. The marketplace 110 may be physically or virtually associated with one or more storage or distribution facilities, such as the fulfillment center 130. The web site 116 may be implemented using the one or more servers 112, which connect or otherwise communicate with the one or more databases 114 as well as the network 150, as indicated by line 118, through the sending and receiving of digital data. Moreover, the database 114 may include any type of information regarding items that have been made available for sale through the marketplace 110, or ordered by customers from the marketplace 110.

The vendor 120 may be any entity or individual that wishes to make one or more items available to customers, such as the customer 140, at the marketplace 110. The vendor 120 may operate one or more order processing and/or communication systems which may be implemented through one or more computing machines that may be connected to the network 150, in order to transmit or receive information regarding one or more items to be made available at the marketplace 110, in the form of digital or analog data, or for any other purpose. For example, the vendor 120 may communicate with the marketplace 110 through one or more interfaces provided by a web browser 126 operating on a computing device that may be connected to the network 150, such as a tablet computer 122, as is indicated by line 128.

The vendor 120 may deliver one or more items to one or more designated facilities maintained by or on behalf of the marketplace 110, such as the fulfillment center 130. Additionally, the vendor 120 may receive one or more items from other vendors, manufacturers or sellers (not shown), and may deliver one or more of such items to locations designated by the marketplace 110, such as the fulfillment center 130, for fulfillment and distribution to customers. Furthermore, the vendor 120 may perform multiple functions. For example, the vendor 120 may also be a manufacturer and/or a seller of one or more other items, and may offer items for purchase by customers at venues (not shown) other than the marketplace 110. Additionally, items that are made available at the marketplace 110 or ordered therefrom by customers may be made by or obtained from one or more third party sources, other than the vendor 120, or from any other source (not shown). Moreover, the marketplace 110 itself may be a vendor, a seller or a manufacturer.

The fulfillment center 130 may be a facility that is adapted to receive, store, process and/or distribute items on behalf of the marketplace 110. As is shown in FIG. 1, the fulfillment center 130 may operate one or more order processing and/or communication systems using a computing device such as a desktop computer 132 and/or software applications having one or more user interfaces 134 (e.g., a web browser), or through one or more other computing machines that may be connected to the network 150, as is indicated by line 138, in order to transmit or receive information in the form of digital or analog data, or for any other purpose. The desktop computer 132 may also operate or provide access to one or more reporting systems for receiving or displaying information or data regarding workflow operations, and may provide one or more interfaces, such as the user interface 134, for receiving interactions (e.g., text, numeric entries or selections) from one or more operators, users or workers in response to such information or data. The desktop computer 132 may further operate or provide access to one or more engines for analyzing the information or data regarding the workflow operations, or the interactions received from the one or more operators, users or workers.

The receiving station 131 may include any apparatuses that may be required in order to receive shipments of items from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft, and preparing such items for storage or distribution to customers. The storage area 133 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 135 may include one or more regions or stations where items that have been retrieved from a designated storage area may be evaluated, prepared and packed for delivery to addresses, locations or destinations specified by customers.

The fulfillment center 130 may further include one or more control systems that may generate instructions for conducting operations at one or more of the receiving station 131, the storage area 133 or the distribution station 135, which may be associated with the desktop computer 132 or one or more other computing machines, and may communicate with the marketplace 110, the vendor 120 or the customer 140 over the network, as indicated by line 138, through the sending and receiving of digital data. Additionally, the fulfillment center 130 may include one or more systems or devices (not shown in FIG. 1) for determining a location of one or more elements therein, such as cameras or other imaging devices.

The fulfillment center 130 may also include one or more workers or staff members, such as a worker 136, for handling or transporting items within the fulfillment center 130, such as from a car, truck, ship or aircraft to a crane, jack, belt or another conveying apparatus at the receiving station 131 to a shelf, bin, rack, tier, bar, hook or other storage means within the storage area 133, or to a defined region within the distribution station 135. Moreover, the worker 136 may operate one or more computing devices for registering the receipt, retrieval, transportation or storage of items within the fulfillment center, such as a handheld device 137, which may be a device that is specifically programmed or adapted for such purposes, or a general purpose device such a personal digital assistant, a digital media player, a smartphone, a tablet computer or a laptop computer, and may include any form of input and/or output peripherals such as scanners, readers, keyboards, keypads, touchscreens or pointing devices.

The customer 140 may be any entity or individual that wishes to download, purchase, rent, lease, borrow or otherwise obtain items (which may include goods, products, services or information of any type or form) from the marketplace 110. The customer 140 may utilize one or more computing devices, such as a smartphone 142 or any other like machine that may operate or access one or more software applications, such as a web browser 144, and may be connected to or otherwise communicate with the marketplace 110, the vendor 120 or the fulfillment center 130 through the network 150, as indicated by line 148, by the transmission and receipt of digital data. Moreover, the customer 140 may also receive deliveries or shipments of one or items from facilities maintained by or on behalf of the marketplace 110, such as the fulfillment center 130, or from the vendor 120 (not shown).

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "customer" or a "worker" may be automated steps performed by their respective computer systems, or implemented within software modules (or computer programs) executed by one or more general purpose computers. Moreover, process steps described as being performed by a "marketplace," a "vendor," a "fulfillment center," a "customer" or a "worker" may be typically performed by a human operator, e.g., via the tablet computer 122, the desktop computer 132, the handheld device 137 or the smartphone 142, but could, alternatively, be performed by an automated agent.

The vendor 120, the fulfillment center 130 and/or the customer 140 may use any web-enabled or Internet applications or features, such as the web browser 144, or any other client-server applications or features including electronic mail (or E-mail), or other messaging techniques, to connect to the network 150 or to communicate with one another, such as through short or multimedia messaging service (SMS or MMS) text messages. For example, in addition to the tablet computer 122, the desktop computer 132, the handheld device 137 or the smartphone 142, those of ordinary skill in the pertinent art would recognize that the vendor 120 or the fulfillment center 130 and/or the customer 140 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers, such as the tablet computer 122, the desktop computer 132, the handheld device 137, the smartphone 142, or any computers or control systems utilized by the customer 140, the fulfillment center 130, the vendor 120 or the marketplace 110 and having sequences of instructions which, when executed by a processor (such as a central processing unit, or CPU), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

For the purposes of illustration, some of the systems and methods disclosed herein may be referenced primarily in the context of fulfilling orders for one or more items at a fulfillment center or other storage facility, such as the fulfillment center 130 shown in FIG. 1, that were placed through a web site maintained on behalf of an online marketplace by one or more customers, such as the web site 116 maintained by the marketplace 110 and accessible to the customer 140, as is shown in FIG. 1. As will be recognized by those of skill in the art, however, the systems and methods disclosed herein may also be used in many other situations, and their utility is not limited to any of the preferred embodiments described herein.

Figure 2A:
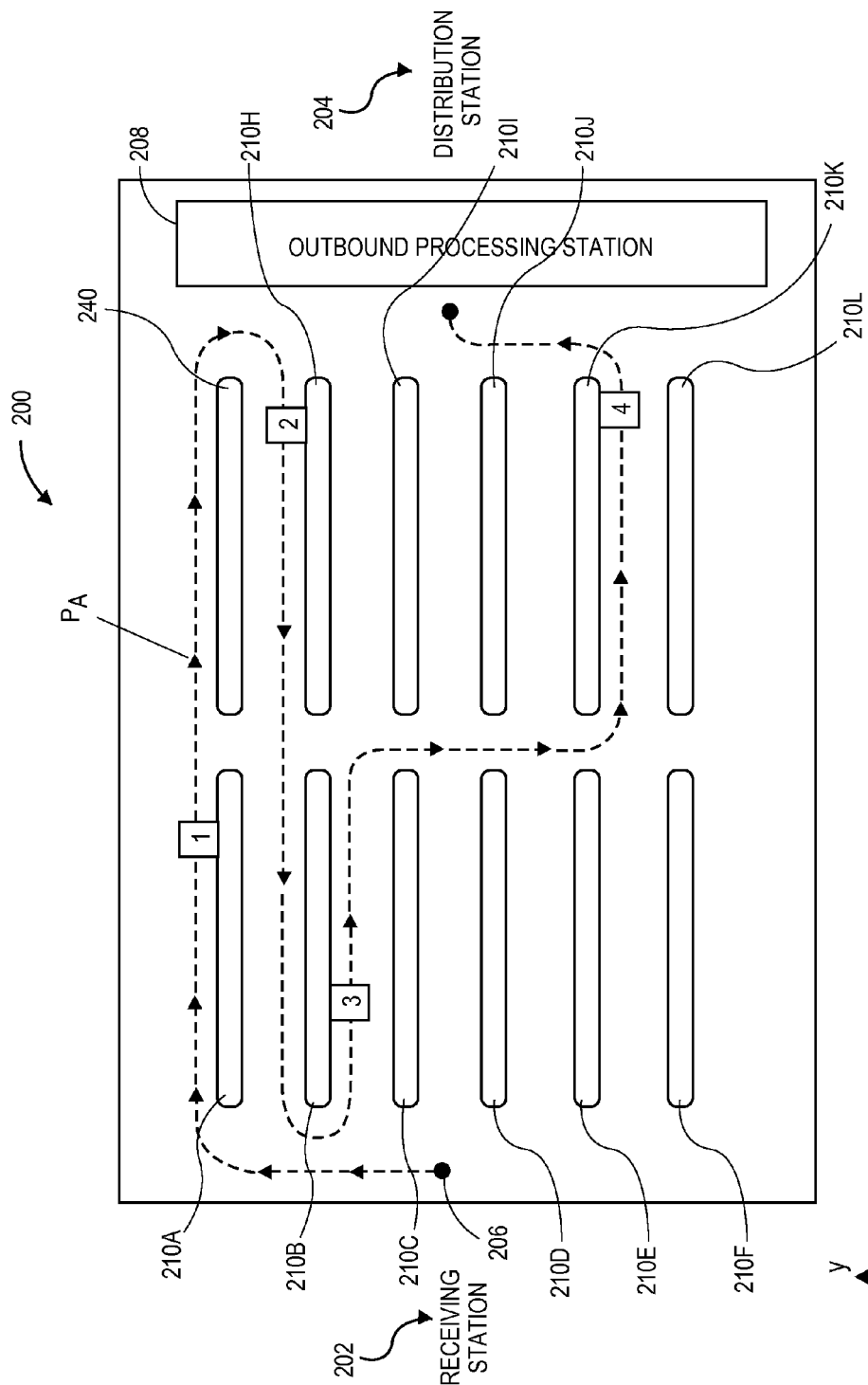
FIGS. 2A and 2B are floor plans for shipment optimization, in accordance with embodiments of the present disclosure.

As is discussed above, existing systems and methods for fulfilling orders of items at a fulfillment center do not consider the locations of the respective items included in the order within the fulfillment center when providing instructions for picking the items to a human operator or machine. Instead, such items are typically retrieved at random, based on an alphabetical or numerical order, or in accordance with a list. Referring to FIG. 2A, a floor plan of a storage area 200 at a fulfillment center is shown. The storage area 200 is configured to receive items from a receiving station 202 and to provide items to a distribution station 204, by way of an outbound processing station 208. The floor plan of the service area 200 includes a variety of shelves 210A, 210B, 210C, 210D, 210E, 210F, 210G, 210H, 210I, 210J, 210K and 210L arranged in aisles and rows.

As is shown in FIG. 2A, a worker who is tasked with retrieving items in fulfillment of an order will typically travel along a path $P_A$ from an origin 206 to a destination 208 (viz., an outbound processing station) while picking Item 1, Item 2, Item 3 and Item 4 in series from the shelves 210A, 210B, 210C, 210D, 210E, 210F, 210G, 210H, 210I, 210J, 210K and 210L, without regard to the proximity or relationship of the origin 206 or the destination 208 to Item 1, Item 2, Item 3 or Item 4, or to one another. Because the path $P_A$ is defined by a serial listing of Item 1, Item 2, Item 3 and Item 4, and without regard to the respective locations of the items within the storage area 200, as is shown in FIG. 2A, the path $P_A$ travels in the direction of the destination 208 and back toward the origin 206, before turning toward the destination 208 again, resulting in substantially increased travel distances and times and costing the fulfillment process in terms of efficiency.

Figure 2B:
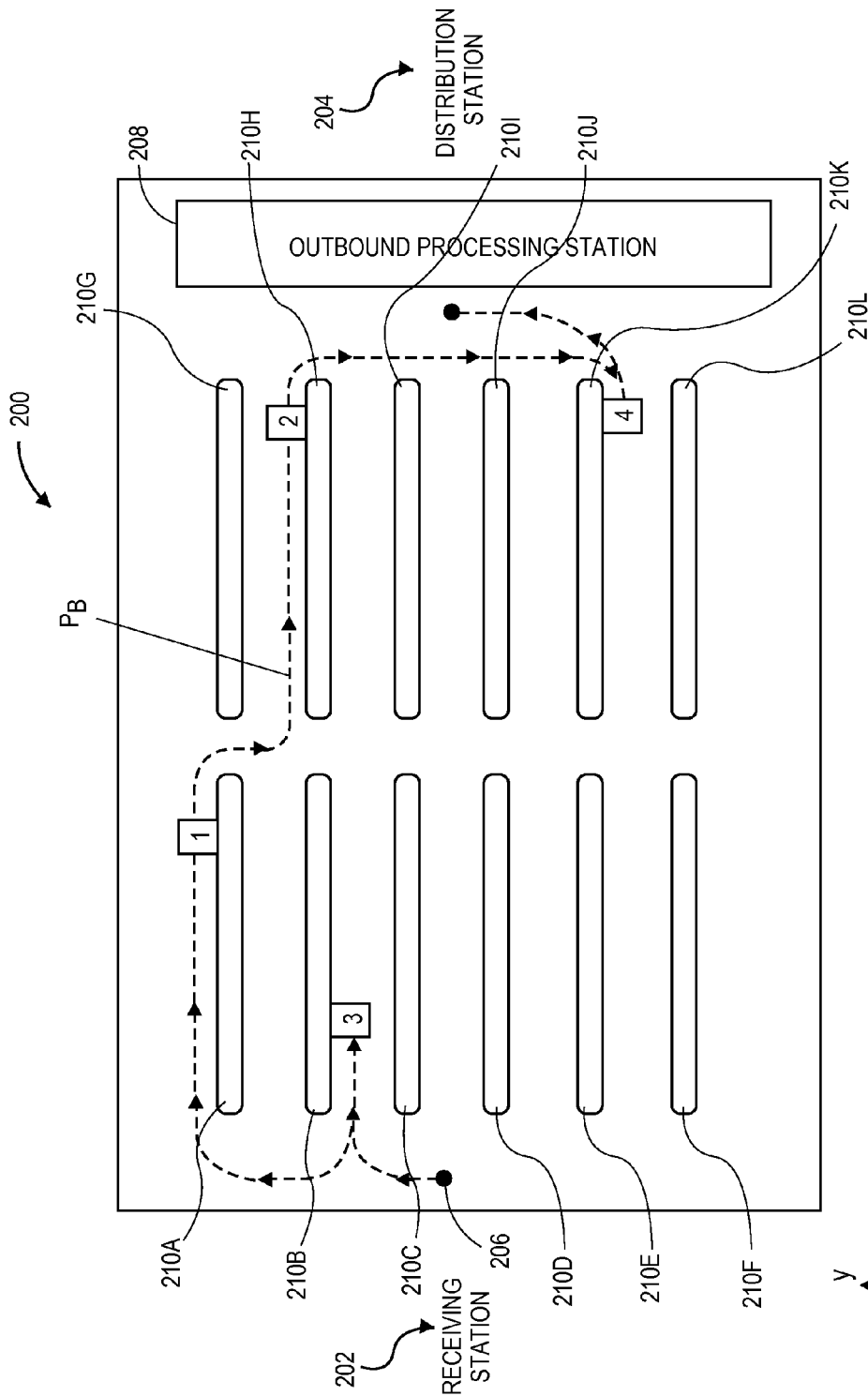

As is discussed above, the systems and methods of the present disclosure are directed to considering the geospatial locations of items within a fulfillment center when generating an optimal path for their retrieval in fulfillment of an order. Referring to FIG. 2B, a floor plan 200 for shipment optimization in a fulfillment center is shown.

As is shown in FIG. 2B, a worker who is tasked with retrieving Item 1, Item 2, Item 3 and Item 4 in fulfillment of an order in accordance with the present disclosure will travel along an optimal path $P_B$ from the origin 206 to the destination 208 while picking Item 3 first, then Item 1 second, before picking Item 2 and Item 4, and advancing to the destination 208. The optimal path $P_B$ is defined based on the respective locations of Item 1, Item 2, Item 3 and Item 4 within the storage area 200, as is shown in FIG. 2B, and thus travels a shortest or minimum practicable route between and among the shelves 210A, 210B, 210C, 210D, 210E, 210F, 210G, 210H, 210I, 210J, 210K and 210L. As compared to the path $P_A$ of FIG. 2A, the optimal path $P_B$ of FIG. 2B results in effectively minimized travel distances and times, and increased efficiency in the fulfillment of the order. When a worker follows the optimal path $P_B$ of FIG. 2B, rather than the path $P_A$ of FIG. 2A, the worker delivers the items to the destination 208, and therefore, to the distribution station 204, as quickly as possible. The worker may fulfill an order more efficiently, and is also ready to fulfill another order more quickly.

As is discussed above, the systems and methods of the present disclosure may consider the geographic locations of one or more items, as well as the architectural features or structural arrangement of a fulfillment center, when generating an optimal path to be followed by a picker in retrieving the items from the fulfillment center for processing and delivery. The geographic locations of the items may be determined on any basis, such as by capturing one or more photographic images of the architectural features or structural arrangement of the fulfillment center and analyzing the images to identify the locations of one or more aisles, rows, bays, shelves, slots, bins, racks, tiers, bars, hooks, cubbies or other storage means containing the items therein, or by manually or automatically providing a list or registry of the locations of the items within the fulfillment center to a computer system.

Figure 3:
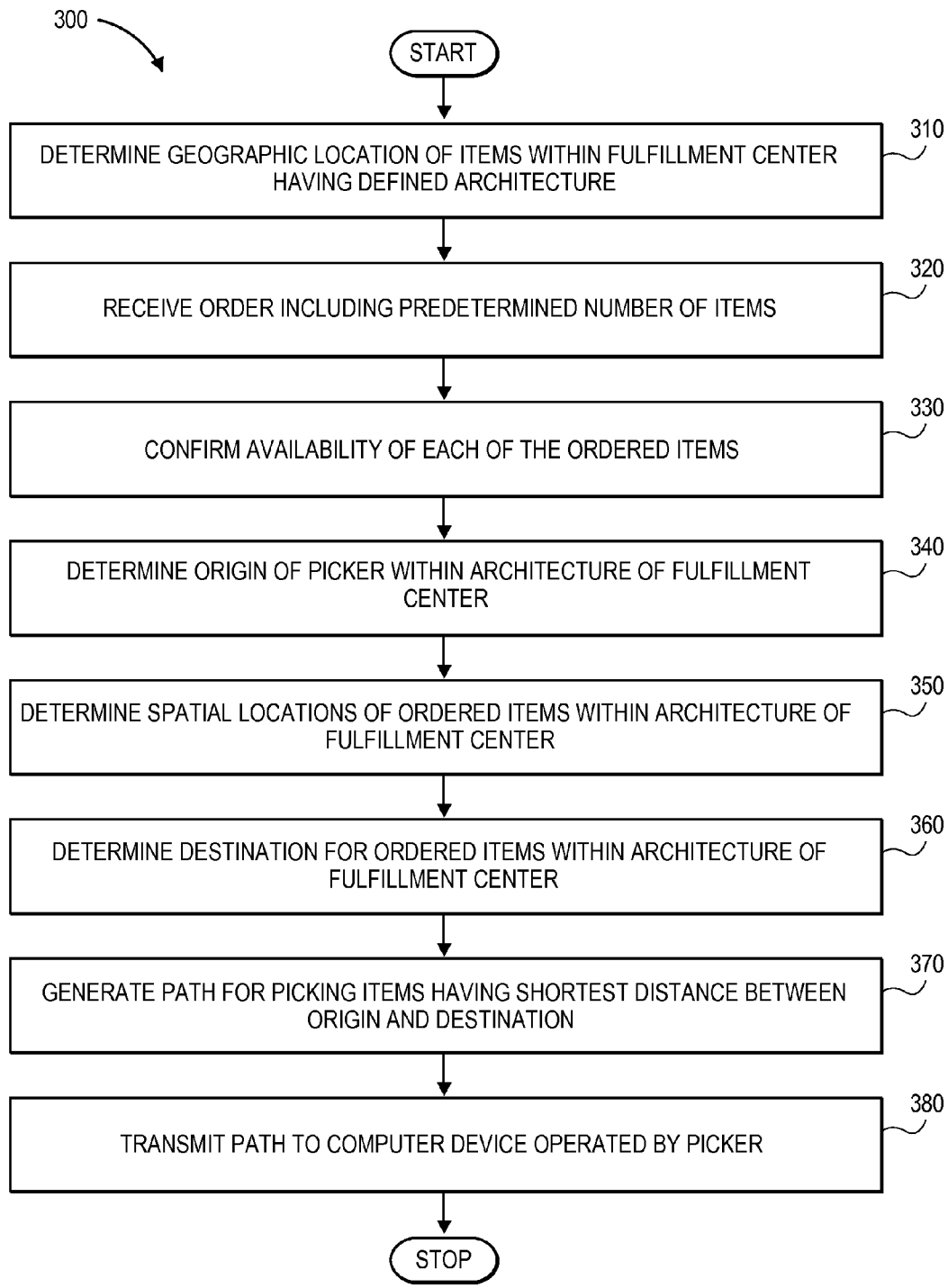
FIG. 3 is a flow chart of one method for shipment optimization, in accordance with embodiments of the present disclosure.

Referring to FIG. 3, a flow chart 300 representing one embodiment of a method for shipment optimization is shown. At box 310, a geographic location of each of the items within a fulfillment center is determined. Such locations may be expressed in absolute or relative terms (e.g., with respect to the fulfillment center), and in coordinates or in any other manner, and may be determined by any means.

At box 320, an order including a predetermined number of items is received. The order may have been placed through an online marketplace or any other channel, and assigned to the fulfillment center. At box 330, the availability of each of the items at the fulfillment center is confirmed. For example, the systems and methods disclosed herein may identify each of the items included in the order that was received at box 320 and determine whether the items are physically present at the fulfillment center, or if one or more of the items is not available at the fulfillment center.

At box 340, the origin of a picker may be determined. For example, the picker may identify his or her location by "checking in," or logging into a computer network, or by using one or more geolocating means, e.g., determining the location of a computer device operated by the picker, by Global Positioning System (or "GPS") or cellular triangulation. At box 350, the spatial locations of the ordered items within an architecture of the fulfillment center may be determined. For example, the locations of the various items included in the order within a fulfillment center may be identified by consulting a table or other record containing information regarding geographic locations of the items, along with the locations of various aisles, rows or shelves of the fulfillment center, that may be stored in at least one data store. At box 360, a destination for the ordered items within the architecture of the fulfillment center may be determined. For example, referring again to the storage area 200 of FIG. 2B, the items may be intended for transfer to the outbound processing station 208, to the distribution station 204, or to any other aspect or area of the fulfillment center.

At box 370, a path for picking the items of the order that minimizes the distance to be traveled between the origin and the destination is generated. Considering where a picker must begin (i.e., the origin determined at box 340, such as the origin 206 of FIG. 2B) and where the picker must arrive with the ordered items (i.e., the destination determined at box 360, such as the outbound processing station 208 of FIG. 2B), an optimal path that enables the picker to retrieve each of the ordered items while traveling the shortest or minimum practicable distance may be determined. Such an optimal path may take into account any known information regarding the locations of the items as well as any structural features within the fulfillment center (e.g., aisles, rows, shelves and the like). At box 380, the generated path is transmitted to a computer device operated by the picker (e.g., the handheld device 137 operated by the worker 136 of FIG. 1), which may be a special-purpose device having one or more displays, such as a scanner or reader, or a general-purpose device such as a tablet computer or smartphone. The picker may thus travel the path when retrieving each of the ordered items, and may confirm the retrieval of the ordered items by any known means, e.g., by scanning or reading an identifier on each of the items, by manually logging the retrieval of each of the items, or in any other manner.

Therefore, according to one embodiment of the present disclosure, the locations of items within a fulfillment center may be determined by any means and, upon the receipt of an order for a predetermined number of the items, an optimal path to be traveled by a human operator or machine that follows the shortest or minimum practicable distance between an origin of the human operator or machine and an intended destination of the items may be generated. The optimal path may take into account not only the locations of the respective items but also the architecture or layout of the various features or elements of the fulfillment center.

Figure 4:
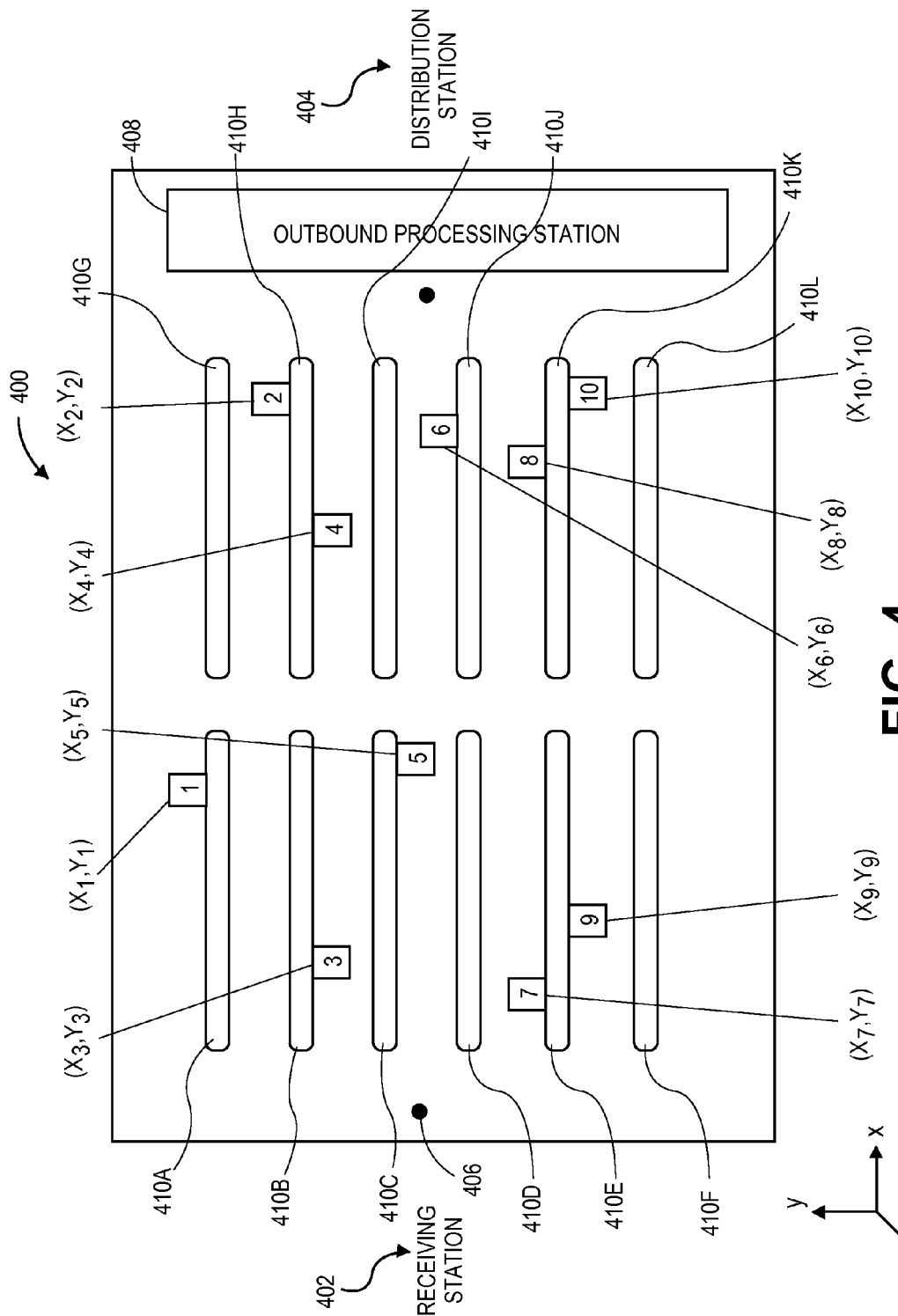
FIG. 4 is a floor plan for shipment optimization, in accordance with embodiments of the present disclosure.

As is discussed above, the locations of items within a fulfillment center may be determined through an analysis of one or more images of the fulfillment center, upon the stowage of the items within the fulfillment center or at any other time, such as following an inventory thereof. The locations of the items may be expressed in (x, y) or (x, y, z) coordinates, or according to any other standard. Referring to FIG. 4, a floor plan of a storage area 400 for shipment optimization is shown. Except where otherwise noted, reference numerals preceded by the number "4" in FIG. 4 indicate components or features that are similar to components or features having reference numerals preceded by the number "2" shown in FIG. 2A or FIG. 2B.

The floor plan 400 includes locations of a plurality of items including Item 1, Item 2, Item 3, Item 4, Item 5, Item 6, Item 7, Item 8, Item 9 and Item 10 as positioned on shelves 410A, 410B, 410C, 410D, 410E, 410F, 410G, 410H, 410I, 410J, 410K and 410L expressed in (x, y) coordinates, i.e., $(x_1, y_1)$, $(x_2, y_2)$, $(x_3, y_3)$, $(x_4, y_4)$, $(x_5, y_5)$, $(x_6, y_6)$, $(x_7, y_7)$, $(x_8, y_8)$ $(x_9, y_9)$ and $(x_{10}, y_{10})$. Once an order is determined to include Item 1 through Item 10, and the coordinates of such items are identified, such coordinates may be utilized to generate an optimal path according to one or more algorithms or formulas. For example, upon determining the (x, y) coordinates of Item 1 through Item 10, viz., $(x_1, y_1)$ through $(x_{10}, y_{10})$, the distances between such items may be calculated with respect to the architecture of the fulfillment center (e.g., the layout of aisles, rows and/or shelves, such as the shelves 410A, 410B, 410C, 410D, 410E, 410F, 410G, 410H, 410I, 410J, 410K and 410L), and provided as inputs to an algorithm or formula such as Dijkstra's Algorithm or the Floyd-Warshall Algorithm.

Those of ordinary skill in the pertinent art recognize that Dijkstra's Algorithm may be used to identify a shortest path between vertices or nodes in a graph. An initial node, or a source node, is identified from a plurality of nodes, and a path tree that extends from the initial node or source node to all of the other nodes is developed. A closest neighboring node having the shortest distance to the initial node or source node (or cost with respect to the initial node or source node) is identified, and distances from the closest neighboring node to all of the other nodes, except the initial node or source node, are further identified. The process is repeated using the node having the shortest distance to the closest neighboring node until the shortest or minimum practicable distances between the initial node and the source node, and all of the other nodes, are determined.

Those of ordinary skill in the pertinent art would further recognize that the Floyd-Warshall Algorithm may be used to identify the shortest path (or least cost) between each vertex or node of a graph, which may be weighted and/or directed. The algorithm begins by generating a distance matrix (i.e., the distance or cost between one node and each of the other nodes) and a predecessor matrix (i.e., the node that is closest, or has the lowest cost, with respect to each of the nodes), and sequentially updating the values of the distance matrix and the predecessor matrix until a shortest distance (or least cost) path between the nodes is identified.

Any other algorithm or formula may be utilized when determining an optimal path to be followed by a picker, and any factors other than the locations of items within the architecture of the fulfillment center (e.g., a layout of aisles, rows and/or shelves within the fulfillment center), may also be considered.

Figure 5:
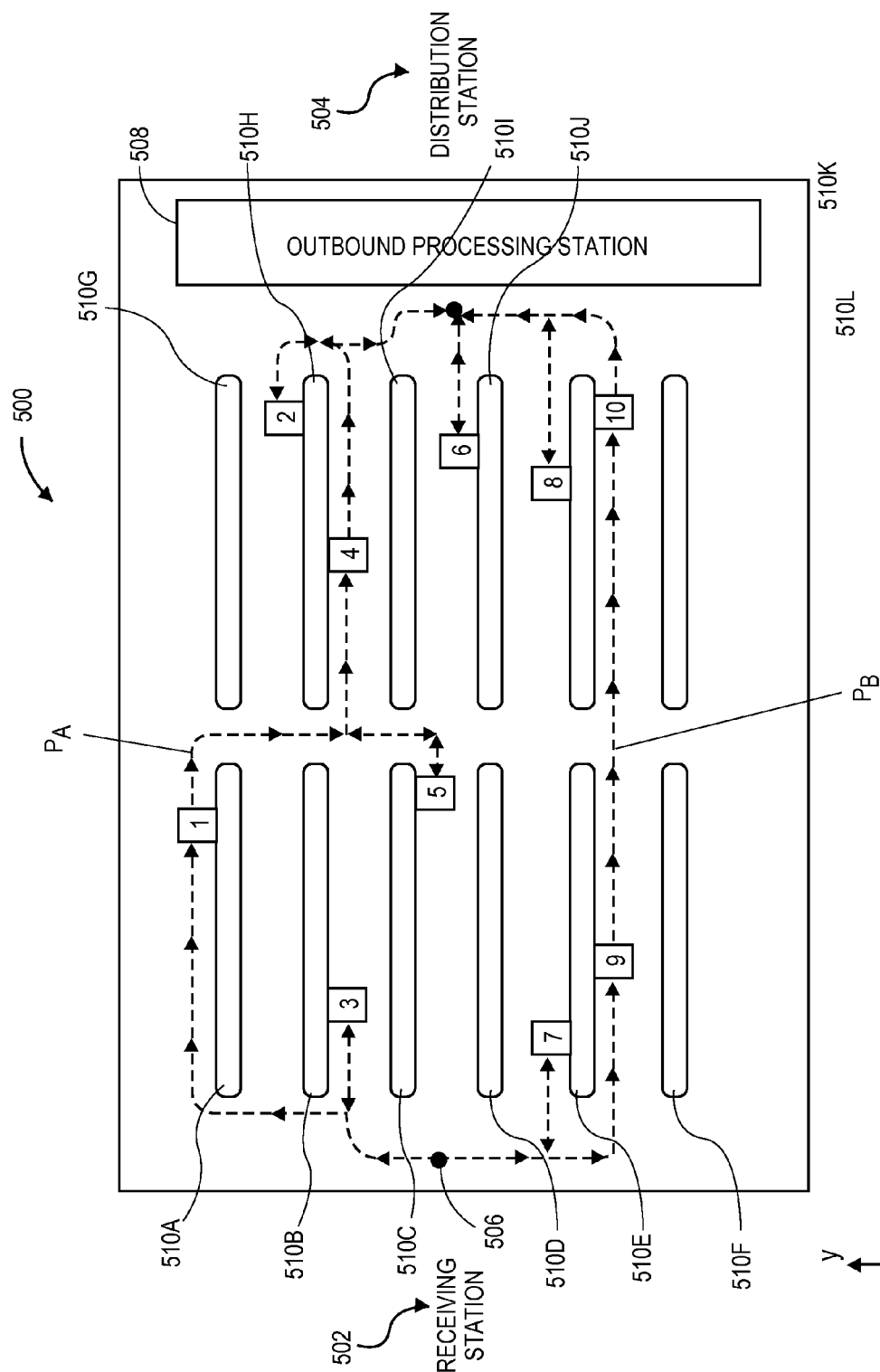
FIG. 5 is a floor plan for shipment optimization, in accordance with embodiments of the present disclosure.

Additionally, the systems and methods of the present disclosure may be used to segment a shipment, or a group of shipments, in a manner that minimizes the distance traveled or time elapsed during the picking of items in the aggregate. Referring to FIG. 5, a floor plan of a storage area 500 at a fulfillment center is shown. Except where otherwise noted, reference numerals preceded by the number "5" in FIG. 5 indicate components or features that are similar to components or features having reference numerals preceded by the number "4" shown in FIG. 4, or components or features having reference numerals preceded by the number "2" shown in FIGS. 2A and 2B.

The floor plan 500 of FIG. 5 shows a plurality of items Item 1, Item 2, Item 3, Item 4, Item 5, Item 6, Item 7, Item 8, Item 9 and Item 10 as positioned on shelves 510A, 510B, 510C, 510D, 510E, 510F, 510G, 510H, 510I, 510J, 510K and 510L. The plurality of items Item 1 through Item 10 may be associated with a single shipment of items to a customer, or multiple shipments of items (e.g., a batch of shipments) to one or more customers. According to some prior art systems and methods for shipment optimization, the items Item 1 through Item 10 may be retrieved from the shelves 510A, 510B, 510C, 510D, 510E, 510F, 510G, 510H, 510I, 510J, 510K and 510L in a random order, in series (i.e., Item 1, followed by Item 2, Item 3, and so on, until Item 10 has been retrieved), or in any other manner. However, according to the systems and methods disclosed herein, the respective geographic locations of the items Item 1 through Item 10 within the fulfillment center may be used to define an optimal path for retrieving such items.

Further, the systems and methods of the present disclosure may also be utilized to determine when the retrieval of items from a fulfillment center should be segmented into two or more paths. As is shown in FIG. 5, two paths $P_A$, $P_B$ for picking the items Item 1 through Item 10 are shown. The path $P_A$ calls for retrieving items Item 1, Item 2, Item 3, Item 4 and Item 5 in a specific order, viz., Item 3, then Item 1, Item 5, Item 4 and Item 2, based on a shortest path between the origin 506 and the destination 508 for the items. The path $P_B$ calls for retrieving the items Item 6, Item 7, Item 8, Item 9 and Item 10 in a specific order, viz., Item 7, Item 9, Item 10, Item 8 and Item 6, based on another shortest path between the origin 506 and the destination 508.

Accordingly, as is shown in FIG. 5, the items of a single order, or the items of a batch of orders, may be retrieved from a fulfillment center in one or more paths that minimize the distance to be traveled, and time elapsed, during the picking of the items. Such paths may be defined based on geographic locations of a picker, the respective items and a destination for the items within the fulfillment center, which may be identified by any means. The systems and methods of the present disclosure may also be utilized to define paths for the retrieval of items of an order that has been segmented into multiple shipments for any other reason. For example, when an order for a plurality of items has been segmented based on the contents, dimensions or any other attributes of one or more of the items of the order (e.g., a size, shape or volume of an item, or whether an item contain hazardous or other incompatible materials), individual paths for retrieving the items in the multiple shipments may be defined based on the respective locations in each of the multiple shipments. Thus, the systems and methods disclosed herein may serve as a basis for determining whether a plurality of items included in an order should be segmented into multiple shipments, and also for determining paths for retrieving items that have been segmented into multiple shipments on any basis.

As is also discussed above, an optimal path for retrieving items from a fulfillment center may be derived based on the geographic locations of various structural features and the items within the fulfillment center, which may be determined by any means. For example, a layout of the structural features and various storage facilities within the fulfillment center (e.g., bins) may be established and one or more images of the features and facilities may be captured using an imaging device, such as a camera. The locations of the features or facilities may be determined by recognizing and analyzing one or more elements of such features or facilities from one or more images, including any shapes or facets of the features or facilities, or any text, numbers or other identifiers that may be mounted, printed or affixed thereon. Consequently, once the locations of the features or facilities within a fulfillment center are determined, the corresponding locations of items within the fulfillment center may be determined by identifying the features or facilities in which such items are stored.

Figure 6:
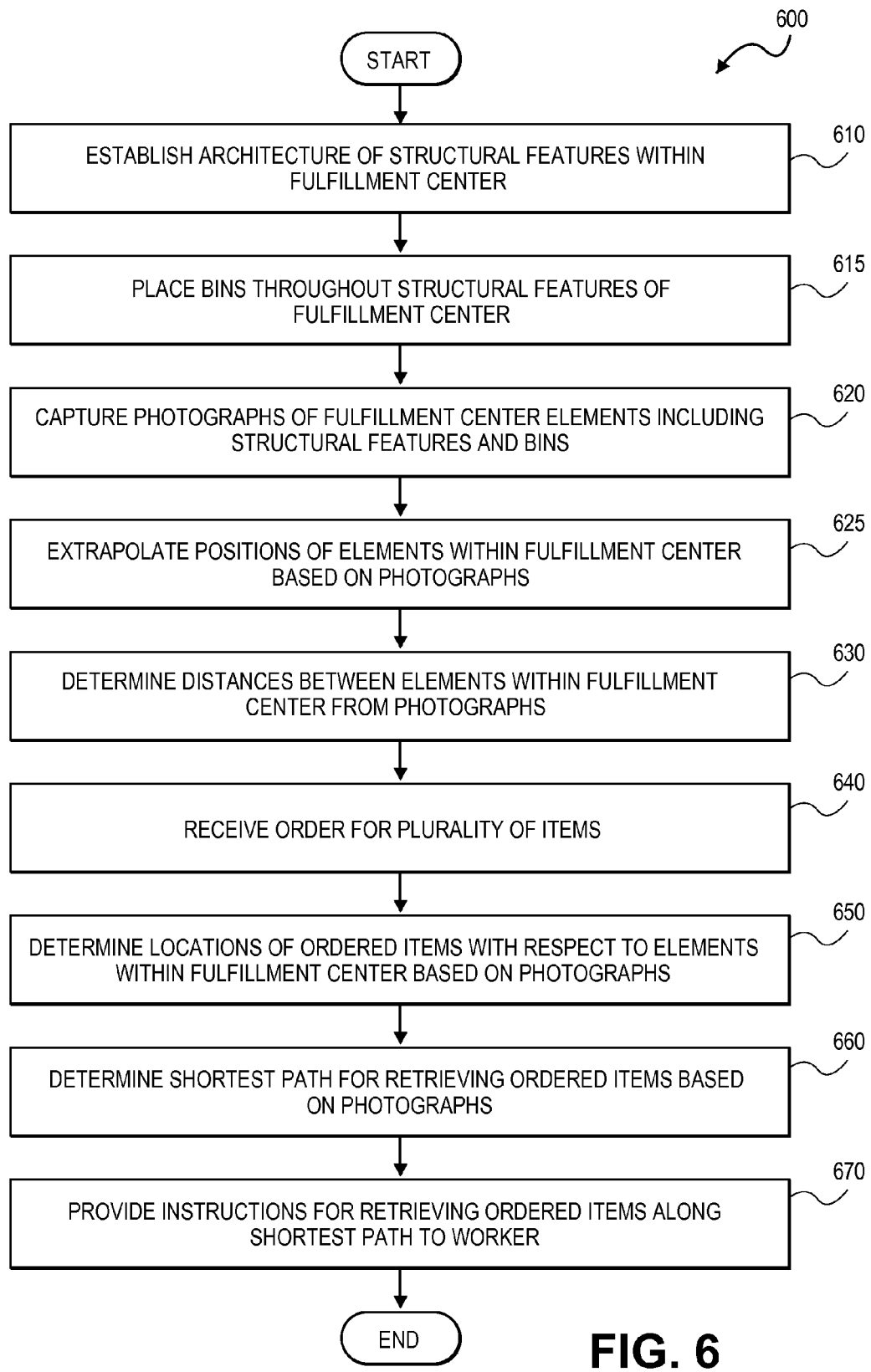
FIG. 6 is a flow chart of one method for shipment optimization, in accordance with embodiments of the present disclosure.

Referring to FIG. 6, a flow chart 600 representing one embodiment of a method for shipment optimization is shown. At box 610, an architecture of structural features within a fulfillment center, including the layout and positioning of one or more aisles, rows, bays or shelves in the fulfillment center, is established, and at box 615, a plurality of bins is placed within the fulfillment center. The bins may be placed on or within bays or shelves that are aligned in aisles or rows in the established architecture, and may include any number or type of items that may be defined in any format. Furthermore, the placement of the bins need not immediately follow the establishment of the architecture of the fulfillment center. For example, the fulfillment center may be laid out with bays or shelves aligned in aisles and rows at a first time, and the bins may be placed, or replaced, within the architecture of the fulfillment center at a second time.

At box 620, one or more images of elements of the fulfillment center, including the structural features and/or the plurality of bins placed within the fulfillment center, are captured. Such images may be taken or recorded from one or more fixed or mobile cameras or other imaging devices within the fulfillment center, and may depict or represent a status or condition of the fulfillment center at a given time. The images may take any form, and may record any view of the structural features and/or bins within the fulfillment center, such as a top view, a front or rear view, or a perspective view. Further, multiple individual images may be combined into a single collage or composite image once the individual have been captured.

At box 625, the positions of elements within the fulfillment center may be extrapolated from the images that were captured at box 620. For example, the images may be processed or otherwise analyzed to determine whether any recognizable features may be identified therein, according to one or more formulas or algorithms. Such formulas or algorithms may be pre-programmed or otherwise trained to identify specific features of a fulfillment center, including a shape of a shelf or rack, or a size or dimension of a bin (e.g., faces, facets, corners, edges, and the like), as well as one or more markings thereon, including text, numbers, bar codes or any other symbols. Moreover, such algorithms may further be pre-programmed or trained to identify or recognize any specific markings or identifiers applied or affixed to an element of the fulfillment center in order to determine a position thereof. For example, the elements of the fulfillment center may include floor markings or other indicia or delineations of position that may be recognized or identified from an analysis of a image.

At box 630, the distances between various elements within the fulfillment center are determined based at least in part on the images. For example, where the positions of various items within one or more of the images may be determined, a point of reference within an image may be selected, and the distances of the various items shown in the image from the point of reference may be estimated. Additionally, where multiple images or other images of a fulfillment center are available, such images may either be analyzed independently, or combined into a single collage or other composite image for analysis. Any means or methods (e.g., photogrammetric analyses) for determining a distance between items expressed within an image may be utilized in accordance with the present disclosure.

At box 640, an order for a plurality of items is received, and at box 650, the locations of the ordered items are determined with respect to the elements within the fulfillment center based on the images. For example, where an item included in an order is identified as being stored in a particular bin or bay, the location of the bin or bay may be determined from the one or more images and associated with the item.

At box 660, the shortest path for retrieving the ordered items may be determined by any means. For example, a path based on the minimum distances between the ordered items may be determined using the distances determined at box 630, according to one or more algorithms or formulas, such as Dijkstra's Algorithm or the Floyd-Warshall Algorithm. Furthermore, the shortest path may also consider or include an origin for one or more workers who may retrieve the items, as well as a destination to which the items should be delivered upon their retrieval (e.g., the outbound processing station 208 of FIG. 2A or 2B). At box 670, the shortest path is provided to a worker along with instructions to retrieve the items, and the process ends.

Accordingly, the systems and methods may utilize one or more images to determine the locations of one or more items within a fulfillment center, as well as the distances between the one or more items within the fulfillment center. The locations of the items may be determined by analyzing one or more identifiers that may be printed on, mounted to or otherwise affixed to the items themselves, or to one or more structural features (e.g., aisles, rows, bays, shelves, slots, bins, racks, tiers, bars, hooks, cubbies or other like means) that may house the items within the fulfillment center, or estimated or extrapolated from the images by any means. Furthermore, the images from which the locations of the items, or the distances between the items, are determined may be captured in real time, or in near-real time.

Once the locations of the items are identified, an optimal path, e.g., a shortest or most convenient path, for retrieving each of the items from their respective locations and transferring the items to a destination may be calculated or otherwise determined. Moreover, one or more images may be analyzed to identify the locations of not only the items and structural features within the fulfillment center but also any intervening objects, obstructions or other hindrances that might delay the retrieval of the items. Therefore, a shortest or most convenient path for retrieving items may be calculated or determined by taking into account the locations of such items, such structural features and any such objects, obstructions or hindrances within the fulfillment center which may impact the efficiency of the retrieval of the items.

Figure 7:
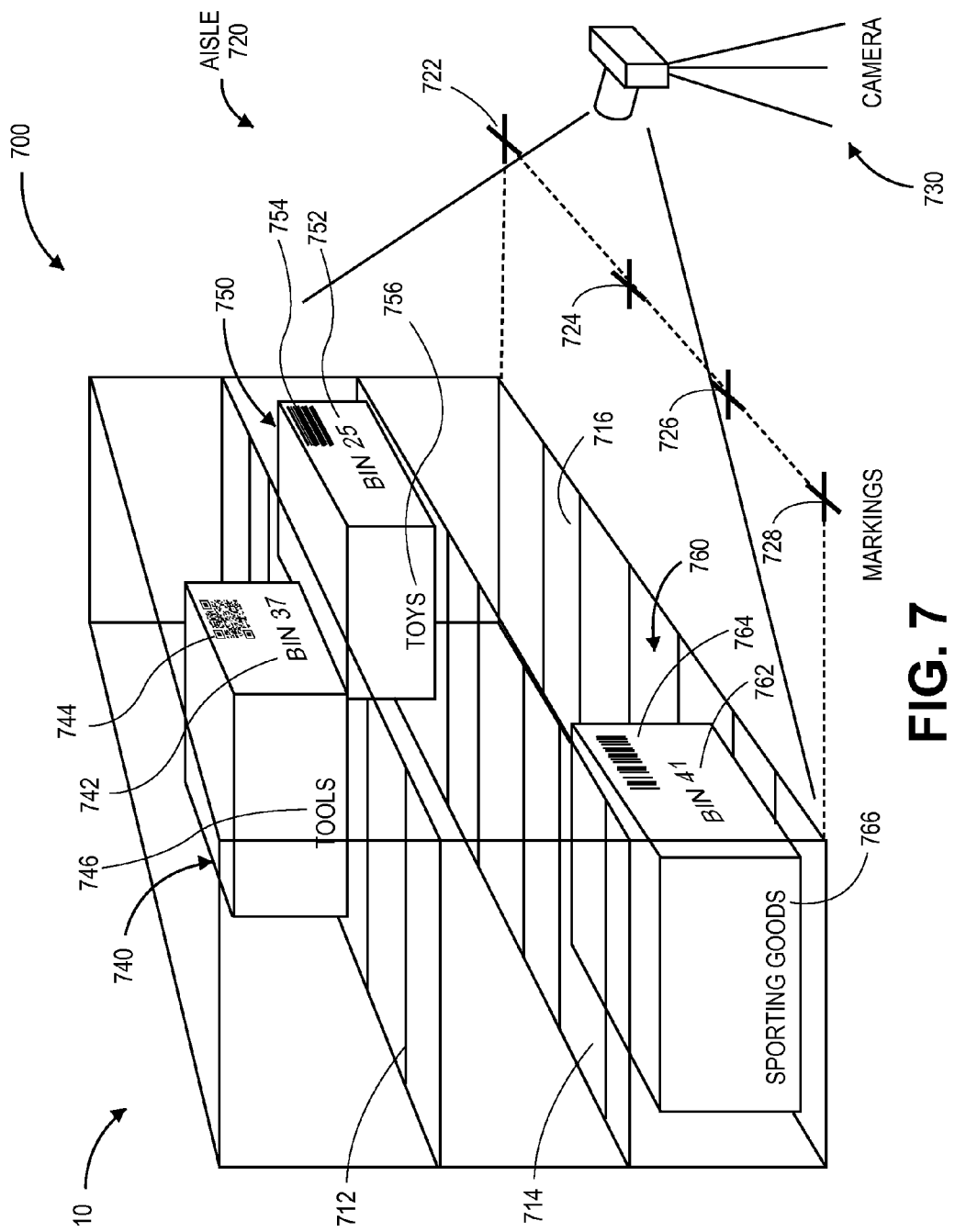
FIG. 7 includes components of one system for shipment optimization, in accordance with embodiments of the present disclosure.

As is discussed above, images of items, storage means and/or structural features within a fulfillment center may be captured and analyzed in order to confirm the locations or positions of such items, storage means or structural features, and to calculate the distances therebetween. Referring to FIG. 7, a portion of a storage area 700 is shown. The storage area includes a shelving system 710, an aisle 720 and one or more imaging devices, such as a camera 730. The shelving system 710 has shelves 712, 714, 716 having bins 740, 750, 760 placed thereon. Each of bins 740, 750, 760 may contain one or more items therein. The aisle 720 includes floor markings 722, 724, 726, 728 identifying discrete, nominal distances on the floor of the aisle 720, such as one foot, one yard, five feet or ten feet. As is shown in FIG. 7, the camera 730 is mounted to a tripod and configured to capture images of the various bins 740, 750, 760.

According to the systems and methods of the present disclosure, any aspect of an image may be identified or evaluated in order to determine the locations of one or more items, storage means or structural features within a fulfillment center, or the distances between such items, storage means or features. For example, as is shown in FIG. 7, each of the bins 740, 750, 760 of items includes one or more external markings that may be photographed using one or more imaging devices and identified. The bin 740 includes a name or title 742 of the bin 740, along with a QR bar code 744 on a front face. On a side face, the bin 740 includes a text-based identifier 746 of the items stored in the bin 740, viz., Tools. The bin 750 further includes a name or title 752 of the bin 750, along with a vertically aligned one-dimensional bar code 754 on a front face. On a side face, the bin 750 includes a text-based identifier 756 of the items stored in the bin 750, viz., Toys. The bin 760 also includes a name or title 762 of the bin 760, along with a horizontally aligned one-dimensional bar code 764 on a front face. On a side face, the bin 760 includes a text-based identifier 766 of the items stored in the bin, viz., Sporting Goods. Additionally, the floor markings 722, 724, 726, 728 within the aisle 720 may be used to determine the locations of items within the bins 740, 750, 760.

Any of the information expressed in an image of the portion of the storage area 700 shown in FIG. 7 may be used to identify and to determine a location of one or more of the items within a fulfillment center, or to calculate or otherwise estimate a distance between the one or more items within the fulfillment center in accordance with the present disclosure. For example, the names or titles 742, 752, 762 or the text-based identifiers 746, 756, 766 of the bins 740, 750, 760 may be identified and optically evaluated by any known means to identify the bins 740, 750, 760, or to determine which items are stored therein. Similarly, the bar codes 744, 754, 764 may be recognized within an image, scanned and evaluated by any known means to identify the bins 740, 750, 760, or to determine what is stored therein. Once a bin is identified, the contents of the bin (i.e., the items contained therein) may be determined by resort to a look-up table or other data record.

Furthermore, where the locations or positions of the floor markings 722, 724, 726, 728 within the aisle 720 are known, the locations or positions of the bins 740, 750, 760 may be determined by photogrammetrically identifying a relation between a representation of one or more of the bins 740, 750, 760 within an image and a representation of at least one of the floor markings 722, 724, 726, 728 within the image. Such relations may further be used to determine a distance between one or more items within the fulfillment center, i.e., by comparing a representation of a known distance between at least two of the floor markings 722, 724, 726, 728 and a representation of at least two of the bins 740, 750, 760. Additionally, although the imaging device shown in FIG. 7 for capturing images of the various bins 740, 750, 760 is a camera 730, those of ordinary skill in the pertinent art would recognize that any type or form of imaging device may be provided for this purpose.

Figure 8:
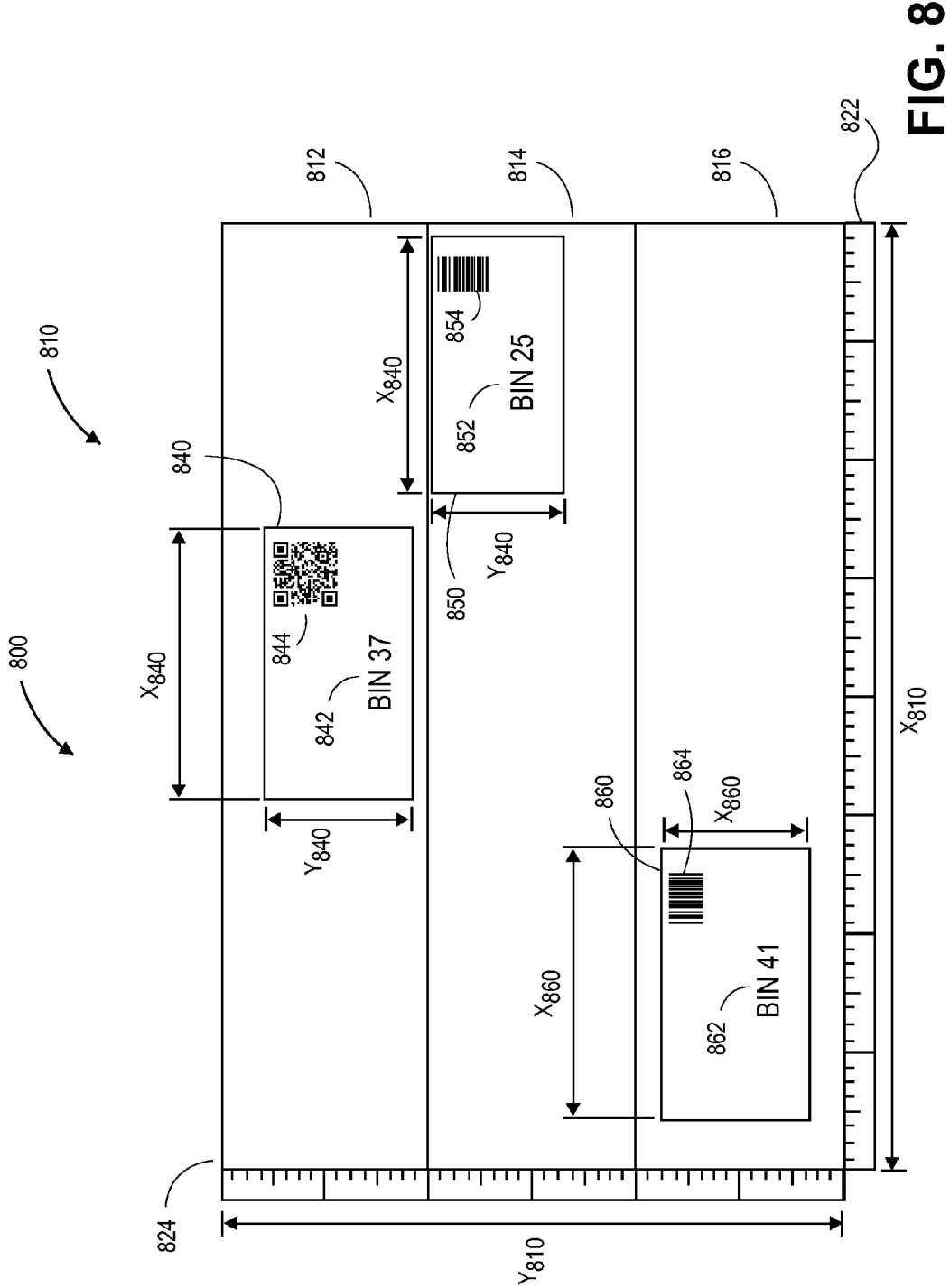
FIG. 8 includes components of one system for shipment optimization, in accordance with embodiments of the present disclosure.

The locations of items within a fulfillment center, or the distances between items within the fulfillment center, may be determined based on known dimensions of one or more features of the items, storage means and/or structural features within the fulfillment center. Referring to FIG. 8, a portion of a storage area 800 is shown. Except where otherwise noted, reference numerals preceded by the number "8" in FIG. 8 indicate components or features that are similar to components or features having reference numerals preceded by the number "7" shown in FIG. 7.

As is shown in FIG. 8, a front view of the portion of the storage area 800 is shown. The storage area 800 includes a shelving system 810 with shelves 812, 814, 816 having bins 840, 850, 860 placed thereon. The shelving system 810 further includes horizontal markings or strips 822 and vertical markings or strips 824 identifying distances in horizontal and vertical directions, respectively. Each of the bins 840, 850, 860 may contain one or more items therein. Moreover, each of the bins 840, 850, 860 further includes a name or title 842, 852, 862 of the bins 840, 850, 860, along with a bar code 844, 854, 864.

The locations of the bins 840, 850, 860 within the fulfillment center may be extrapolated from one or more images of the shelving system 810 by analyzing the lengths and/or dimensions of the bins 840, 850, 860 against the horizontal markings or strips 822, the vertical markings or strips 824, or the known dimensions of the bins 840, 850, 860. For example, the horizontal markings 822 or the vertical markings 824 captured within a image of a bin 840, 850, 860 may serve as a basis for identifying distances or locations with respect to one or more dimensions in the image, which may be extrapolated based at least in part on the known distances represented by the horizontal markings 822 or the vertical markings 824. Further, where the dimensions of items, storage means or structural features of a fulfillment center are known, i.e., the height $y_{840}$ and width $x_{840}$ of the bin 840, the height $y_{850}$ and width $x_{850}$ of the bin 850, or the height $y_{860}$ and width $X_{860}$ of the bin 860, as well as the height $y_{810}$ and width $x_{810}$ of the shelving system 810, such dimensions may also be used to extrapolate a location of an item, or a distance between items, based at least in part on one or more images.

Figure 9:
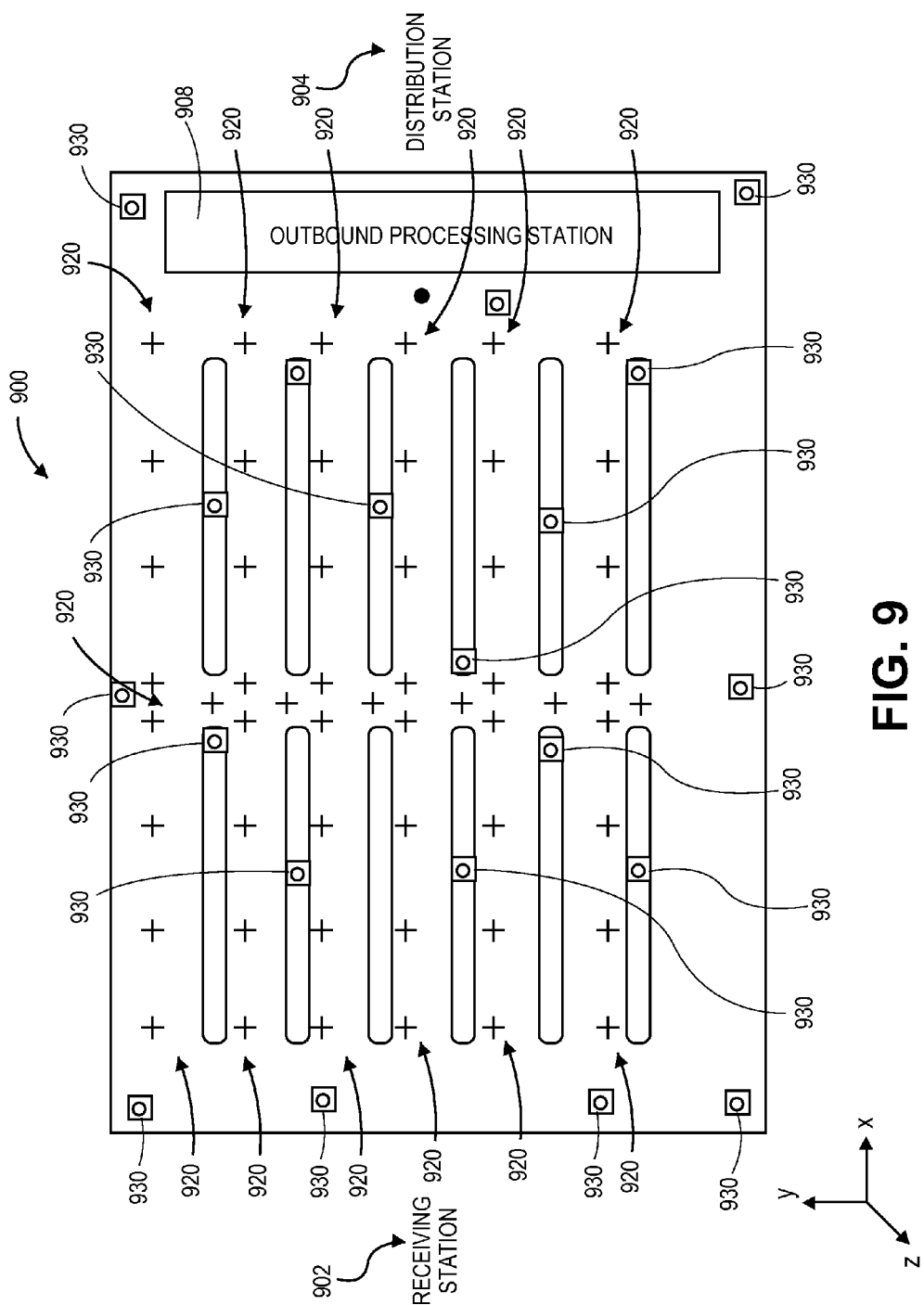
FIG. 9 is a floor plan for shipment optimization, in accordance with embodiments of the present disclosure.

As is discussed above, images indicative of the condition of a fulfillment center may be captured or recorded using one or more fixed or mobile cameras or other imaging devices strategically placed within the fulfillment center. Referring to FIG. 9, a floor plan of a storage area 900 for shipment optimization is shown. Except where otherwise noted, reference numerals preceded by the number "9" in FIG. 9 indicate components or features that are similar to components or features having reference numerals preceded by the number "5" shown in FIG. 5, reference numerals preceded by the number "4" shown in FIG. 4, or reference numerals preceded by the number "2" shown in FIG. 2A or 2B.

As is shown in FIG. 9, the storage area 900 includes a plurality of shelves forming a variety of aisles 920, each having floor markings thereon. The storage area 900 further includes a plurality of cameras 930 installed or distributed throughout the storage area 900 in a variety of strategically placed locations, including at corners of the storage area 900, aligned along one or more aisles of the storage area 900, positioned atop one or more structural features and/or storage means within the storage area (e.g., a shelving system). As is discussed above, any number of images may be combined and collectively analyzed when extracting or extrapolating one or more locations or distances therefrom. In this regard, the number and placement of cameras 930 within the storage area 900 of the fulfillment center is not limited. Furthermore, as is discussed above, although the imaging devices that are shown as distributed throughout the storage area 900 shown in FIG. 9 are cameras 930, those of ordinary skill in the pertinent art would recognize that any type or form of imaging device may be provided for this purpose.

Figure 10:
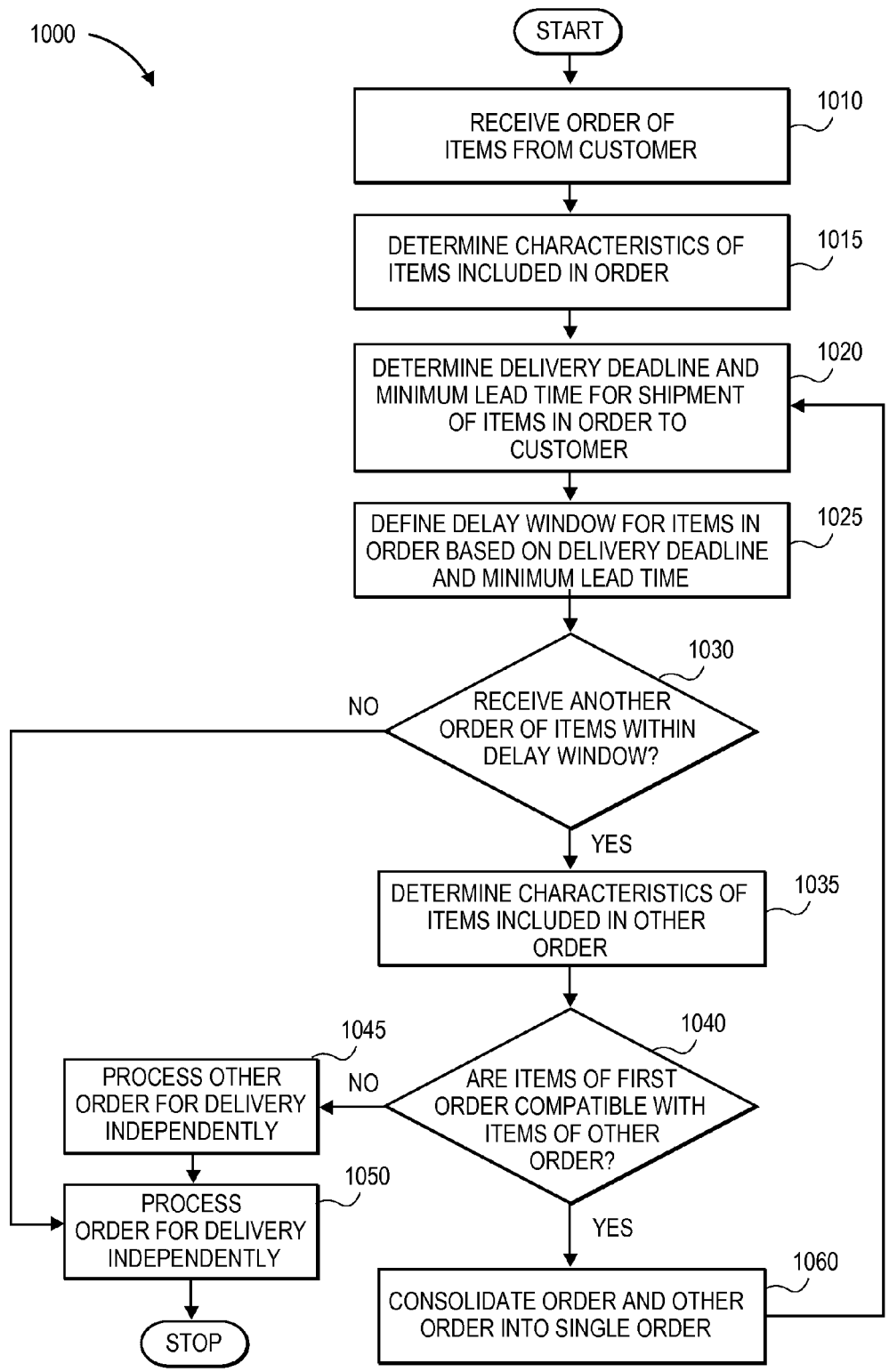
FIG. 10 is a flow chart of one method for shipment optimization, in accordance with embodiments of the present disclosure.

Additionally, as is also discussed above, the systems and methods for shipment optimization disclosed herein may further consider the times at which multiple orders for delivery to a common destination are received when determining whether the items of the various orders may be combined with one another for the purpose of processing the orders prior to their delivery to the common destination. Referring to FIG. 10, a flow chart 1000 representing one embodiment of a method for shipment optimization is shown. At box 1010, an order of items is received from a customer, who may have placed the order in any manner, such as by accessing one or more web sites maintained by an online marketplace, making a telephone call, or visiting a traditional bricks-and-mortar store in person.

At box 1015, the characteristics of the items included in the order may be determined. Such characteristics may include a type of the items (e.g., a category or group of items such as automobile repair parts, kitchen appliances or school supplies), a size of the items (e.g., a length, a width, a height, a volume, a diameter, a surface area, a mass or any other attribute pertaining to size), a shape of the items (e.g., substantially rectangular, cylindrical, spherical or pyramidal), or ingredients, contents or intended uses of the items, or any other factors that may be related to the items. At box 1020, a delivery deadline and a lead-time for the shipment of the items in the order to the customer may be determined. The delivery deadline may be based on a selected shipping option (e.g., two-day shipping, economy shipping) or a holiday or occasion (e.g., a wedding or birthday), as well as one or more of the characteristics of the items (e.g., a spoliation date for one or more items included in the order). The lead-time may also be based on any factor related to actions that must be performed to fulfill an order for an item, including but not limited to time that may be required to obtain the item, to prepare the item for delivery, or to cause the item to arrive in advance of the delivery deadline.

At box 1025, a delay window, or a consolidation window, may be defined for the shipment of the items in the order based at least in part on the delivery deadline and the minimum lead-time. For example, where an order for an item placed on a given day, with delivery requested in three days, and where preparing the order for delivery will require twelve hours, the delay window or consolidation window may be defined as approximately two-and-a-half days, or the amount of time until the order must be fulfilled in order to arrive in advance of the delivery deadline. At box 1030, it is determined whether another order of items is received within the delay window. If no other order is received during the delay window, then the method advances to box 1050, where the order is processed independently.

If another order is received during the delay window, however, then the method advances to box 1035, where the characteristics of the items included in the other order are determined. For example, as with the characteristics of the ordered items determined at box 1015, such characteristics may relate to the type, the size, the shape, the ingredients, contents or intended uses of the items included in the other order. At box 1040, it is determined whether the items of the order are compatible with the items of the other order. For example, if the items of the order and the items of the other order are in a common category, or may have common shipping requirements (e.g., ceramic dinnerware or cleaning products), such items may typically be transported together in a common container. If the items of the order and the items of the other order are not in the same category, however, or do not have common shipping requirements, such items typically may not be transported together. Compatibility may also be determined with regard to any characteristics or limitations of the containers and/or the orders, as well. For example, if the items of the order and the items of the other order are too large or massive to fit in a common container, then such items may not be transported together. Likewise, if the items of the order and the items of the other order are to be delivered to a customer at a shipping destination having a limited area or volume (e.g., a post office box), combining the items into a single, larger common container may be infeasible and not preferred by the customer.

If the items of the order and the items of the other order are not compatible with one another, then the method advances to box 1045, where the other order is processed for delivery independently, and to box 1050, where the order is processed for delivery independently. If the items of the order are compatible with the items of the other order, however, then the method advances to box 1060, where the order and the other order are consolidated into a single order, before returning to box 1020, where a delivery deadline and a lead-time for the shipment of the items in the order to the customer may be determined. If any further orders are received within the delay window, such orders may be considered for consolidation with the consolidated order, as well.

Those of ordinary skill in the pertinent art would recognize that the method for shipment optimization represented in the flow chart 1000 of FIG. 10 may be utilized at any stage of a fulfillment process. For example, the delay window associated with an order that is defined at box 1025 of FIG. 10 may include any time prior to the delivery of the order to a customer, including times at which items are retrieved from storage and prepared for delivery. Thus, a determination as to whether multiple orders may or should be consolidated into a single order may be made at any time.

Figure 11:
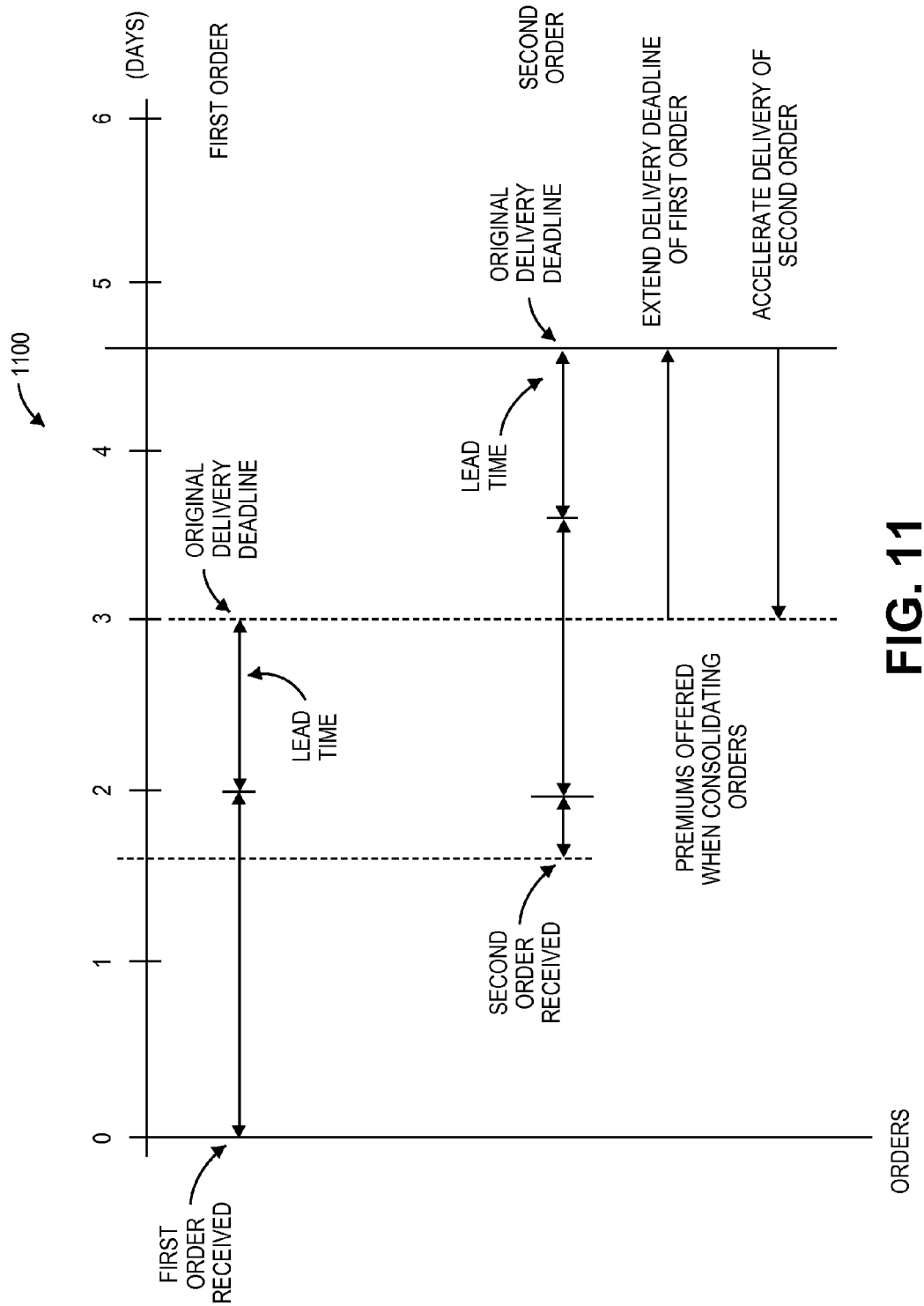
FIG. 11 is an event diagram of one process for shipment optimization, in accordance with embodiments of the present disclosure.

As is discussed above, the consolidation of the items included in multiple orders may result in substantial cost savings or time savings for an online marketplace, for example, where such items may be shipped in fewer containers, and with smaller postage costs or with earlier delivery dates. Accordingly, at least some of the cost savings or time savings may be shared with customers, in order to incentivize the consolidation of orders that are to be delivered to a common destination. Referring to FIG. 11, a timeline 1100 representing the placement of multiple orders, and the consideration as to whether such items in such order may be shipped together, is shown. The timeline indicates the receipt of a first order on day 0, with an original delivery deadline of day 3. The timeline also indicates the receipt of a second order between day 1 and day 2, with an original delivery deadline between day 4 and day 5.

As is discussed above, where a subsequent order for an item is received prior to a minimum lead-time of a previous order, then the subsequent order may potentially be consolidated with the previous order. As is shown in FIG. 11, because the second order was received prior to the lead-time for the delivery of the first order, the second order may be potentially consolidated with the first order. Moreover, one or more premiums or discounts may be offered to the customer to encourage the consolidation of the orders. For example, as is shown in FIG. 11, a customer may be offered free or reduced shipping charges on the first order if the delivery deadline for the first order may be extended to coincide with the delivery deadline of the second order. Conversely, the customer may be offered a discount on premium shipping charges for accelerating the delivery of the second order to coincide with the delivery date of the first order. As is discussed above with regard to the method for shipment optimization represented in the flow chart 1000 of FIG. 10, a determination as to consolidate an original order with a subsequently received order may be made at any time or at any stage of the fulfillment process, between a time at which the original order is received and a time at which the original order is delivered to the customer.

Figure 12A:
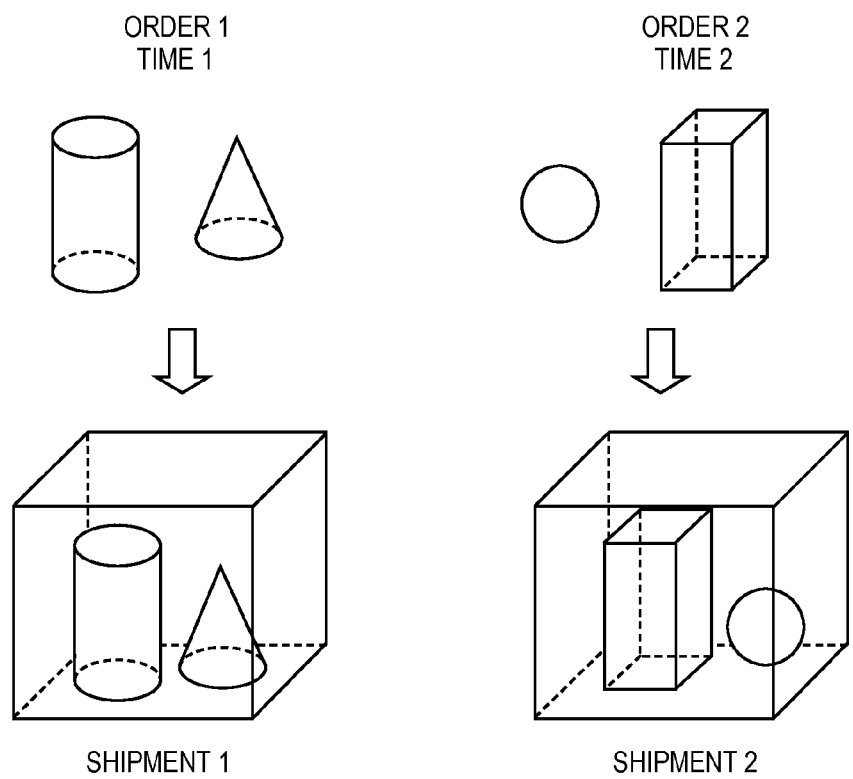
FIGS. 12A and 12B are representations of item shipments for shipment optimization, in accordance with embodiments of the present disclosure.
Figure 12B:
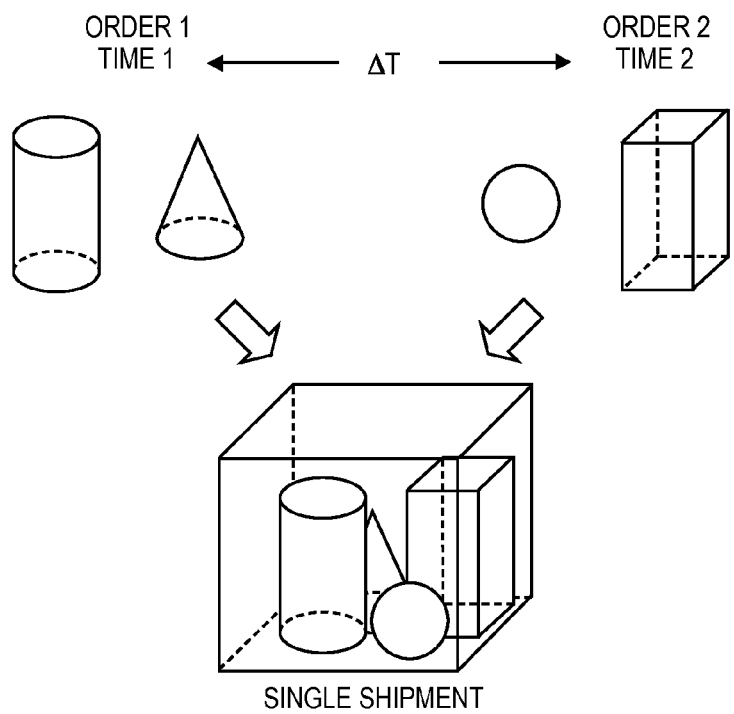

Some benefits of the consolidation of orders according to the systems and methods of the present disclosure are shown in FIGS. 12A and 12B. As is shown in FIG. 12A, a first order (e.g., Order 1) received at a first time (e.g., Time 1) and a second order (e.g., Order 2) received at a second time (e.g., Time 2) are typically delivered in separate shipments (e.g., Shipments 1 and 2), even if such orders are to be delivered to a common destination. As is shown in FIG. 12B, however, if the first order and the second order are received within a sufficient window of time (e.g., $\Delta T$), the orders may be processed together, and the ordered items may be delivered in a single shipment. Thus, the systems and methods of the present disclosure may result in the delivery of fewer and/or fuller containers of ordered items, which may result in more efficient processing of orders, and at lower costs.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although many of the embodiments described herein or shown in the accompanying figures refer to facilities for fulfilling orders of items that have been place at an online marketplace, viz., fulfillment centers, the systems are not so limited, and may be utilized in connection with any facility at which items or objects may arrive and depart in response to demand therefor.

Likewise, the determination of one or more locations of items within a storage area, or distances between items within a storage area, based on one or more images of the storage area may occur in real time or in near-real time, or in one or more back-end processes. Furthermore, those of ordinary skill in the pertinent art will recognize that such images may be analyzed using one or more local computer systems at a fulfillment center, or may be transmitted to one or more remote computer systems located elsewhere.

Although some of the embodiments disclosed herein reference the capturing of information regarding one or more storage means or structural facilities, such as the bins 740, 750, 760 or the shelving system 710 of FIG. 7, those of ordinary skill in the pertinent art would recognize that the systems and methods disclosed herein are not so limited, and that images of items themselves may be captured and analyzed in order to extrapolate locations of such items, or distances between such items, in accordance with the present disclosure.

Furthermore, although many of the embodiments described herein or shown in the figures refer to human operators, e.g., pickers, the systems and methods are not so limited, as many of the systems and methods disclosed herein may be directed to the minimization of distances traveled by machines, e.g., robots, in the retrieval of items from a fulfillment center or like facility.

Moreover, as is discussed above, the systems and methods of the present disclosure are not limited to the generation of optimal paths for retrieving items from storage based on their respective locations of such items within a fulfillment center, and may be used in any other application in which a process is to be performed along an optimal path between locations. For example, the systems and methods disclosed herein may be equally appropriate in the performance of diverse tasks such as returning books to shelves within a library or research facility, or monitoring a parking facility for violators. Those of ordinary skill in the pertinent arts would recognize that the systems and methods disclosed herein are not limited to the fulfillment of orders in general, or to fulfillment center operations in particular.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 6 or 10, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-implemented method comprising:
   receiving an order for a plurality of items over a network, wherein each of the plurality of items is located in a fulfillment center;
   identifying, for each of the plurality of items, a container having the item;
   obtaining a plurality of images depicting at least one aspect of the fulfillment center;
   processing, for each of the identified containers, at least one of the plurality of images to identify a unique location with respect to a floor plan of the fulfillment center of the identified container;
   wherein the processing includes:
      optically recognizing an identifier of the container depicted in the at least one of the plurality of images;
      optically recognizing an identifier applied to a structural portion of the fulfillment center depicted in the at least one of the images, wherein the identifier applied to the structural portion of the fulfillment center corresponds to a position with respect to the floor plan of the fulfillment center; and
      determining the unique location based at least in part on the optically recognized identifier of the identified container and the optically recognized identifier applied to the structural portion of the fulfillment center; and
   determining a minimum practicable distance between each of the identified containers based at least in part on the determined unique locations of the identified containers;
   determining an optimal path for retrieving the plurality of items from the fulfillment center based at least in part on the minimum practicable distances between each of the identified containers; and
   providing information regarding the optimal path to at least one worker, wherein the information comprises an instruction to retrieve each of the plurality of items from the fulfillment center along the optimal path.

2. The computer-implemented method of claim 1, wherein processing the at least one of the plurality of images to identify the unique location with respect to the floor plan of the fulfillment center of each of the identified containers further includes:
   extrapolating the unique location with respect to the floor plan of the container from the at least one of the plurality of images.

3. The computer-implemented method of claim 1, wherein providing information regarding the optimal path to the at least one worker further comprises:
   transmitting the information regarding the optimal path to a computing device associated with the worker over the network.

4. The computer-implemented method of claim 1, wherein the identifier of the container includes at least one of: text, numbers, a one-dimensional bar code, or a two-dimensional bar code.

5. The computer-implemented method of claim 1, wherein the determining a minimum practicable distance between each of the identified containers is further based at least in part on a location with respect to the floor plan of the fulfillment center of an aisle or a row.

6. The computer-implemented method of claim 1, wherein the plurality of images are captured by cameras subsequent to the order being received.

7. The computer-implemented method of claim 1, wherein determining an optimal path includes determining a specific order for the plurality of items to be retrieved.

8. The computer-implemented method of claim 1, further comprising:
   identifying a lead time for the order;
   determining a delay window for the order based at least in part on the determined lead time;
   subsequent to the receiving the order, receiving within the determined delay window a second order for a second plurality of items;
   determining that a destination of the second order and a destination of the order are the same;
   identifying, for each of the second plurality of items, a container having the item;
   wherein, for each of the second plurality of items, processing at least one of the plurality of images to identify a unique location of the identified container with respect to the floor plan of the fulfillment center.

9. The computer-implemented method of claim 1, further comprising:
prior to the processing the at least one of the plurality of images, combining the plurality of images into a composite image.

10. The computer-implemented method of claim 1, wherein the floor plan of the fulfillment center includes at least one of a two-dimensional or a three-dimensional representation of the fulfillment center and the unique location of each identified container includes a corresponding two-dimensional coordinate or three-dimensional coordinate.

11. A non-transitory computer-readable medium having computer-executable instructions stored thereon, wherein the instructions, when executed, cause a computer system having at least one computer processor to perform a method comprising:
receiving information regarding an order comprising a plurality of items, wherein each of the plurality of items is stored in a facility;
receiving information regarding at least one image depicting at least one aspect of the facility, wherein the information regarding the at least one image is maintained in at least one data store;
for each of the plurality of items, determining a unique location with respect to a floor plan of the facility of the item based at least in part on an analysis of the at least one image;
determining a minimum practicable distance between each of the plurality of items of the order based at least in part on the determined unique locations;
generating a first path for retrieving the plurality of items of the order based at least in part on the determined unique location of each of the plurality of items and the determined minimum practicable distances; and
storing an association between the order and the first path in the at least one data store.

12. The non-transitory computer-readable medium of claim 11, wherein the method further comprises:
providing information regarding the first path to a worker, wherein the information comprises an instruction to retrieve the plurality of items from the facility along the first path.

13. The non-transitory computer-readable medium of claim 12, wherein providing the information regarding the first path to the worker further comprises:
transmitting the information regarding the first path to a computing device associated with the worker.

14. The non-transitory computer-readable medium of claim 11, wherein the method further comprises:
identifying an origin of the first path based at least in part on a location signal provided by a device of a worker, wherein the generating the first path is further based at least in part on the origin.

15. The non-transitory computer-readable medium of claim 11, wherein receiving the information regarding at least one image depicting the at least one aspect of the facility further comprises:
capturing the at least one image depicting the at least one aspect of the facility; and
storing the information regarding the at least one image in the at least one data store.

16. The non-transitory computer-readable medium of claim 11, wherein the at least one aspect of the facility is one of the plurality of items.

17. The non-transitory computer-readable medium of claim 11, wherein the at least one aspect of the facility is a storage element of the facility.

18. The non-transitory computer-readable medium of claim 17, wherein the storage element of the facility is at least one of:
a shelf within the facility;
an aisle within the facility;
a wall within the facility;
a floor within the facility;
a ceiling within the facility; or
a container comprising at least one of the plurality of items of the order within the facility.

19. The non-transitory computer-readable medium of claim 18, wherein the facility comprises at least one recording device configured to capture the at least one image.

20. The non-transitory computer-readable medium of claim 11, wherein determining the unique location with respect to the floor plan of the facility further comprises:
determining the unique location with resect to the floor an of the facility of the at least one aspect of the facility based at least in part on the analysis of the at least one image; and
associating the unique location with respect to the floor plan of the facility of the at least one aspect of the facility with at least one of the plurality of items of the order.

21. The non-transitory computer-readable medium of claim 20, wherein determining the unique location of the at least one aspect of the facility comprises:
recognizing the at least one aspect of the facility depicted in the at least one image.

22. The non-transitory computer-readable medium of claim 21, wherein the at least one aspect of the facility includes at least one marking associated with a location, and wherein determining the unique location of the at least one aspect of the facility further comprises:
extrapolating the unique location of the item based at least in part on the location associated with the at least one marking.

23. The non-transitory computer-readable medium of claim 11, wherein receiving the information regarding the at least one image depicting the at least one aspect of the facility comprises:
receiving a plurality of images depicting at least a portion of the facility, wherein the portion of the facility comprises the at least one aspect; and
wherein determining the unique location with respect to the floor plan of the facility of the item comprises:
analyzing at least one of the plurality of images depicting at least the portion of the facility to determine a location of the at least one aspect of the facility; and
associating the location of the at least one aspect of the facility with the item.

24. A system for processing orders for items comprising:
a fulfillment center having a storage area comprising a plurality of bins for storing items;
a plurality of imaging devices mounted within the storage area, wherein the imaging devices are configured to capture images of the storage area; and
a networked computing device having at least one computer processor configured to at least:
cause a capturing of a plurality of images of the storage area using at least one of the plurality of imaging devices;
receive information regarding an order for a plurality of items;

determine, for each of the plurality of items of the order, a bin within the storage area in which the item of the order is stored;

process the plurality of images to determine, for each of the bins, a unique location with respect to a floor plan of the storage area, wherein the unique location of a first bin is processed based at least in part on an analysis of an identifier of the first bin that is depicted in at least one of the plurality of images;

determine distances between each of the bins in which the plurality of items of the order are stored based at least in part on the determined unique locations;

generate an optimal path for retrieving the plurality of items associated with the order from the bins in which the plurality of items of the order are stored based at least in part on the determined distances; and transmit information regarding the optimal path to a computer device associated with a worker.

25. The system of claim 24, wherein the networked computing device having the at least one computer processor is further configured to at least:

determine a unique location with respect to the floor plan of the fulfillment center of the computer device associated with the worker based at least in part on a location signal provided b computer device;

determine a unique location of the worker within the fulfillment center based at least in part on the location signal of the computer device of the worker; and determine a destination for the plurality of items of the order within the fulfillment center, wherein the optimal path is generated based at least in part on the determined unique location of the worker and the determined destination of the items of the order.

26. The system of claim 24, wherein the networked computing device having the at least one computer processor is further configured to at least:

recognize a marked identifier within at least one of the plurality of images; and associate the marked identifier with one of the bins in which the plurality of items of the order are stored.

27. The system of claim 24, wherein the networked computing device having the at least one computer processor is further configured to at least:

recognize a storage element of the storage area within at least a first one of the plurality of images;

determine a location of the storage element with respect to the floor plan from at least the first one of the plurality of images;

recognize one of the bins in which the plurality of items of the order are stored within at least a second one of the plurality of images; and extrapolate a unique location of the one of the bins based at least in part on the determined location of the storage element.

28. The system of claim 27, wherein the storage element is at least one of:

a shelf within the storage area;
an aisle within the storage area;
a wall within the storage area;
a floor within the storage area; or
a ceiling within the storage area.

* * * * *